United States Patent
Han et al.

(10) Patent No.: US 12,229,078 B2
(45) Date of Patent: Feb. 18, 2025

(54) NEURAL PROCESSING UNIT SYNCHRONIZATION SYSTEMS AND METHODS

(71) Applicant: T-Head (Shanghai) Semiconductor Co., Ltd., Shanghai Free Trade Area (CN)

(72) Inventors: Liang Han, Campbell, CA (US); Chengyuan Wu, Fremont, CA (US); Ye Lu, Shanghai (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

(21) Appl. No.: 18/006,845

(22) PCT Filed: Nov. 2, 2020

(86) PCT No.: PCT/CN2020/125818
§ 371 (c)(1),
(2) Date: Jan. 25, 2023

(87) PCT Pub. No.: WO2022/088171
PCT Pub. Date: May 5, 2022

(65) Prior Publication Data
US 2023/0259486 A1 Aug. 17, 2023

(51) Int. Cl.
*G06F 15/173* (2006.01)
*G06F 15/167* (2006.01)

(52) U.S. Cl.
CPC ...... *G06F 15/17325* (2013.01); *G06F 15/167* (2013.01)

(58) Field of Classification Search
CPC .......................... G06F 15/167; G06F 15/17325
See application file for complete search history.

(56) References Cited

U.S. PATENT DOCUMENTS

| 7,809,663 B1 * | 10/2010 | Birch | G06N 20/00 706/14 |
| 2017/0091651 A1 * | 3/2017 | Miao | G06F 8/65 |

(Continued)

FOREIGN PATENT DOCUMENTS

| CN | 104035751 A | 9/2014 |
| CN | 108446770 A | 8/2018 |

(Continued)

OTHER PUBLICATIONS

PCT International Search Report and Written Opinion mailed Aug. 9, 2021, issued in corresponding International Application No. PCT/CN2020/125818 (7 pgs.).

(Continued)

*Primary Examiner* — Michael J Metzger
(74) *Attorney, Agent, or Firm* — Finnegan, Henderson, Farabow, Garrett & Dunner, LLP

(57) ABSTRACT

Systems and methods for exchanging synchronization information between processing units using a synchronization network are disclosed. The disclosed systems and methods include a device including a host and associated neural processing units. Each of the neural processing units can include a command communication module and a synchronization communication module. The command communication module can include circuitry for communicating with the host device over a host network. The synchronization communication module can include circuitry enabling communication between neural processing units over a synchronization network. The neural processing units can be configured to each obtain a synchronized update for a machine learning model. This synchronized update can be obtained at least in part by exchanging synchronization information using the synchronization network. The neural processing (Continued)

units can each maintain a version of the machine learning model and can synchronize it using the synchronized update.

24 Claims, 11 Drawing Sheets

(56) References Cited

U.S. PATENT DOCUMENTS

| | | |
|---|---|---|
| 2020/0027033 A1 | 1/2020 | Garg et al. |
| 2020/0160171 A1 | 5/2020 | Rangarajan et al. |
| 2021/0019152 A1* | 1/2021 | Pudipeddi .............. G06N 3/084 |
| 2021/0073615 A1* | 3/2021 | Niwa ....................... G06N 3/04 |
| 2021/0125102 A1* | 4/2021 | Ohtsuji .................. G06N 3/045 |
| 2022/0318622 A1* | 10/2022 | Gu ....................... G06Q 20/326 |

FOREIGN PATENT DOCUMENTS

| | | |
|---|---|---|
| CN | 108805795 A | 11/2018 |
| CN | 108805798 A | 11/2018 |
| CN | 110135575 A | 8/2019 |
| CN | 111193971 A | 5/2020 |
| CN | 111582494 A | 8/2020 |

OTHER PUBLICATIONS

First Office Action issued in corresponding Chinese Application No. 202080105894.4 on Dec. 31, 2021, (25 pages).

* cited by examiner

NEURAL PROCESSING UNIT SYNCHRONIZATION SYSTEMS AND METHODS

CROSS-REFERENCE TO RELATED PATENT APPLICATIONS

This application is a national stage filing under 35 U.S.C. § 371 of International Application No. PCT/CN2020/125818, filed on Nov. 2, 2020, the contents of which are incorporated herein by reference in its entirety.

BACKGROUND

Distributing execution of a machine-learning application among multiple computing nodes (e.g., devices, central processing units, neural processing units, hardware accelerators, individual cores, or the like) can improve the performance of the machine-learning application (e.g., support more-complicated machine-learning tasks, perform machine-learning tasks more rapidly, or the like). During such distributed execution, each of the multiple computing nodes may maintain a state. Correct execution of the machine-learning application may require repeated synchronization of these states. Such synchronization can include obtaining synchronization information generated by the computing nodes, generating an updated state, and configuring the computing nodes with the updated state. Depending on the application, synchronization may consume a substantial fraction of the execution time of a machine-learning application. In some conventional distributed implementations, for example, the training time for a neural network may be dominated by the time required to synchronize neural-network parameters among computing nodes during training.

SUMMARY

The disclosed systems and methods relate to a processing unit configurable to use a synchronization network to exchange synchronization information with other processing units.

The disclosed embodiments include a processing unit. The processing unit can include a first communication module including circuitry for communicating between a host unit and the processing unit over a first communication network. The processing unit can be configurable to receive training information for a machine learning model, using the first communication module, from the host unit.

The processing unit can include a core. The processing unit can be configurable using the training information to generate update information using the core The processing unit can include a second communication module including circuitry for communicating between the processing unit and at least one second processing unit over a second communication network. The second communication network can be separate from the first communication network. The processing unit can be configurable using the training information to transmit first synchronization information for updating the machine learning model to the at least one second processing unit. The first synchronization information can include or be based upon the update information.

The disclosed embodiments include a device. The device can include a first host device and first processing units. Each of the first processing units can include a first communication module and a second communication module. The first communication module can include circuitry for communicating with the first host device over a first network. The second communication module can include circuitry enabling communication between the each one of the first processing units and at least another one of the first processing units over a second network. The first processing units can be configured to obtain, by each of the first processing units, a synchronized update for a machine learning model at least in part by exchanging synchronization information using the second network. Each of the first processing units can maintain a version of the machine learning model and each of the first processing units can synchronize each version by updating each version using the synchronized update.

The disclosed embodiments include a method of training a machine learning model. The method can include obtaining a selection of a training subset of a training dataset. The selection can be obtained from a first host device of a set of host devices by a first processing unit of a first set of processing units associated with the first host device using a first communication network. The method can further include generating first update information for the machine learning model by applying a batch of the training subset to the machine learning model. The first update information can be generated using a command processor of the first processing unit. The method can also include obtaining a synchronized update at least in part by providing first synchronization information to at least one other processing unit. The synchronized update can be obtained using a communication processor of the first processing unit and a second communication network. The first synchronization information can be or can be based at least in part upon the first update information. The method can include updating the machine learning model using the synchronized update.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1A:
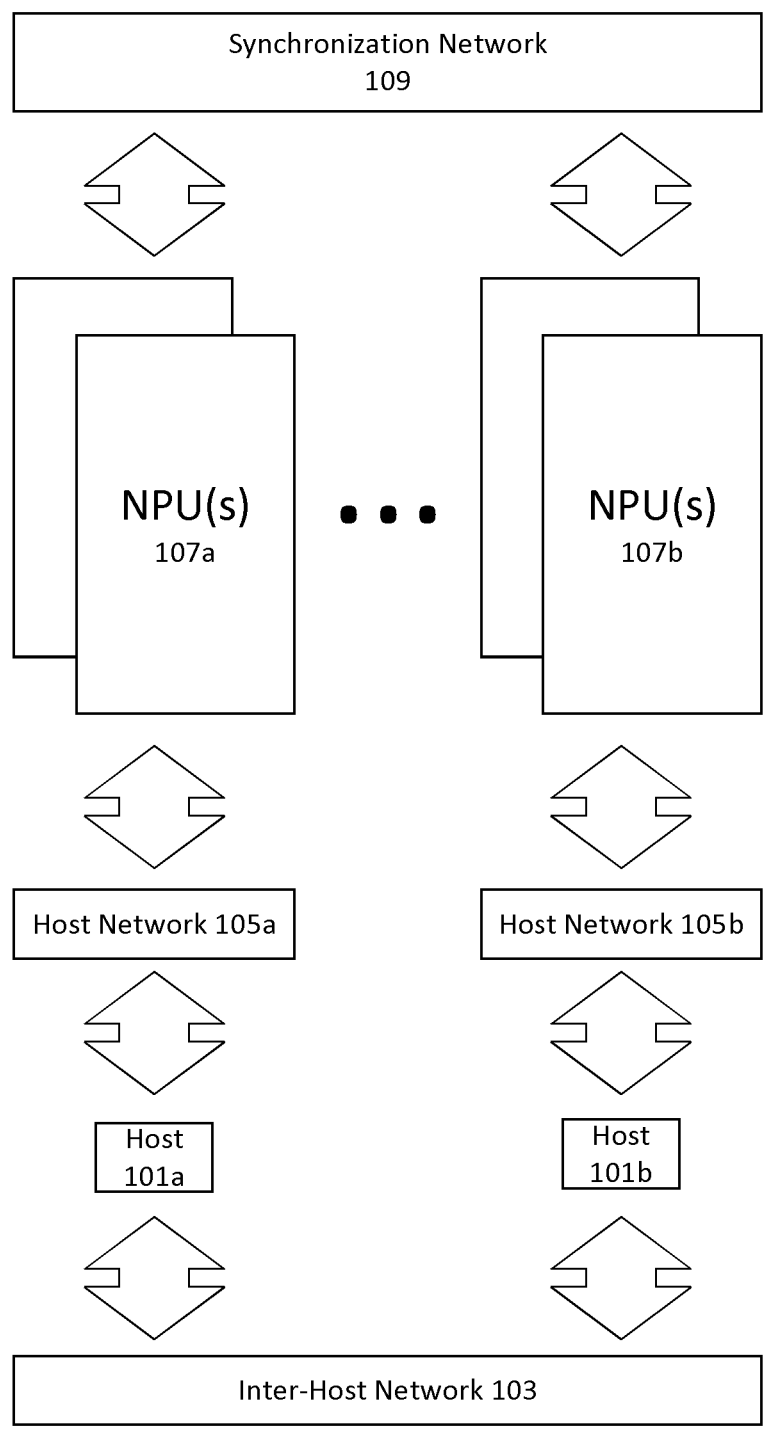
FIG. 1A depicts an exemplary system including a synchronization network that interconnects neural protection units, in accordance with some embodiments of the present disclosure.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Performance of machine-learning (ML) tasks can be improved using processors adapted for such tasks or hardware accelerators (e.g., neural processing units). Neural processing units (NPUs) consistent with disclosed embodiments can be configured to separate execution of ML tasks and synchronization of NPUs. Such NPUs can be configured with two communications modules. A host communication module can support communication between an NPU and a host system using a first network. A synchronization module can support communication between the NPU and other NPUs (which need not be controlled by the same host system, or even part of the same computing device) using a second network. In addition, NPUs can be configured to support computation-along-propagation of the updated state (e.g., the updated state can be generated and distributed as part of the exchange of synchronization information among the NPUs). In some embodiments, NPUs can include a communication processor configured to support computation-along-propagation of the updated state. Such a configuration may not require synchronization of the NPUs by a host processor or device. Through these technological improvements, the synchronization time used by a ML task can be reduced, reducing the overall time required to perform the ML task.

The disclosed embodiments can be used in conjunction with out-of-order execution (e.g., software or hardware pipelining, or the like) to speed execution of an ML task. NPUs consistent with disclosed embodiments can be configured to reorder instructions or distribute instructions between NPU components to improve utilization of computing resources. For example, an NPU can be configured to generate an update to a neural network using a command processor and core(s) and the distribute the update using a communication processor. The NPU can be configured to use the command processor and core to perform another task assigned to the NPU during distribution of the update. Based on the structure of the ML task (e.g., presence or type of data dependencies, or the like), the other task may concern the ML task (e.g., the task may concern the next iteration of the ML task, or the like) or may not concern the ML task (e.g., the task may concern a separate instance of the ML task, another ML task, or some other application).

The disclosed embodiments can support reductions in complexity and improvements in performance of computing clusters. Some conventional computing cluster layouts include computing devices connected to a hierarchy of switches. For example, a cluster of computing devices can be connected to an aggregation switch, or to a top-of-rack switch that is in turn connected to the aggregation switch. Multiple clusters of computing devices can be connected to aggregation switches in this manner. Aggregation switches can in turn be connected to routers, to provide connectivity to remote computing devices. Inclusion of the switches and routers can increase the complexity and decrease the performance of the computing cluster. Consistent with disclosed embodiments, interconnections between the NPUs in the computing devices can replace or supplement the switches and routers. The performance and functionality requirements of the conventional switches and routers can be concomitantly reduced. In some embodiments, the interconnections between NPUs can enable implementation of a distributed system within a cluster of NPUs (which need not be within the same computing device), rather than within a cluster of computing devices.

Distributed training of neural networks can use synchronized stochastic gradient descent on many distributed computing nodes to accelerate training. NPUs consistent with disclosed embodiments can exploit the data parallelism of such an approach and are therefore particularly well-suited to distributed training of neural networks. However, though described herein with regards to such machine learning applications, the disclosed embodiments are not so limited. Instead, the described technical improvements (e.g., in application execution speed, NPU utilization, and computing clusters performance and complexity) can be achieved more generally by the disclosed embodiments in the context of distributed applications (e.g., big data processing and querying, or the like) and computing clusters configured to execute such distributed applications.

FIG. 1A depicts an exemplary system 100 including a synchronization network that interconnects NPUs. The NPUs can be controlled by (and communicate with) host devices using a host network. The host devices can communicate using an interhost network. By offloading distribution of update information onto the synchronization network, the amount of time required for synchronization of NPUs performing a ML task can be reduced. Furthermore, requirements for the interhost network or the host network can be relaxed (e.g., supporting simpler, cheaper, or more-flexible implementations), or these networks can be configured to perform additional tasks (e.g., supporting additional functionality, more-efficient utilization of existing components or architectures, or the like). In some embodiments, system 100 can be or implement a computing cluster or a communicatively connected set of computing clusters. For example, system 100 can be implemented using a cluster of processors (e.g., CPUs and NPUs) on a single device, separate devices (e.g., distributed computing devices), or some combination of single- or multi-processor devices.

Host devices (e.g., host 101a and host 101b, or the like) can be configured to control associated NPUs (e.g., NPUs 107a and NPUs 107b, or the like). A host device and associated NPUs may or may not be part of the same computing device. In some embodiments, a host device may push data or instructions to NPUs associated with the host device. As discussed herein, such data and instructions can be processed by the associated NPUs.

A host device can include a processor, such as a central processing unit, application specific integrated circuit, field programmable gate array, graphical processing unit, or the like. In some instances, a host device can be configured to execute an ML task. Such execution can include assigning tasks to (or receiving results from) other host devices or NPUs associated with the host device. In various instances, a host device can be configured to receive tasks from another host device and assign tasks (based on the received tasks) to NPUs associated with the host device. In such instances, the host device can receive results from the associated NPUs and provide these results (or an output based on these results), to the other host device.

A host device can include a host memory. The host memory can be an integral memory, or an external memory associated with the host device. The host memory can be implemented using techniques or devices known to the art (e.g., cache, RAM, solid state drives, magnetic drives, optical storage, or the like). For example, the host memory can be a double data rate synchronous dynamic random-access memory (e.g., DDR SDRAM) or the like. The host memory can be configured to store a large amount of data with slower access speed, compared to a memory integrated into the associated NPUs. In some embodiments, the host memory can be configured to act as a higher-level cache for the associated NPUs. For example, data or instructions stored in the host memory can be transferred to one or more NPUs associated with the host device for use in executing an ML task.

In some embodiments, a host device can implement or support a compiler. The compiler can be a program or computer software that transforms computer codes written in a programming language into instructions for execution by an NPU. In ML task, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can generate a neural network with a predetermined architecture (e.g., connections among neurons and weights of the neurons).

Interhost network 103 can include a wired or wireless network enabling communication between host devices. Such a network can be implemented using known network technologies (e.g., Ethernet, WiFi, cellular, or similar data links and TCP/IP, UDP, or similar protocols). In some embodiments, interhost network 103 can be implemented using Infiniband, RapidIO, or similar network technologies. Interhost network 103 can include switches, routers, firewalls, or other components disposed between host devices (not shown).

Host networks (e.g., host network 105a, host network 105b, or the like) can enable communication between a host device and one or more NPUs. In some embodiments, the host networks can be implemented using a bus interface (such as a PCI express bus, or the like) or a network technology like Infiniband, RapidIO, NVLink, bluelink, or the like.

NPUs (e.g., NPU(s) 107a, NPU(s) 107b, or the like) can be configured to execute instructions received using a host network from an associated host device. An NPU can execute instructions received from an associated host device. The NPU can execute the instructions using data received from the associated host device using the host network, or from other sources (e.g., data received from another system, database, streaming endpoint, or the like). An NPU can execute instructions received from an associated host device using synchronization data received from other NPUs using synchronization network 109. The components of an exemplary NPU are described herein with regards to FIG. 2A.

Synchronization network 109 can be configured to support communication between NPUs. Such communication can be point-to-point communication. For example, an NPU can use synchronization network 109 to communicate directly with another NPU, without any switch, host, router, or other networking device interposed between the NPUs. Synchronization network 109 can be implemented using NVLink, InfiniBand, or a similar high-bandwidth serial communication protocol. As depicted in FIG. 1A, synchronization network 109 can connect NPUs in different computing devices or associated with different host devices.

Synchronization network 109 is not limited to any particular network topology. In various embodiments, NPUs in the cluster can be connected according to a ring, a hub-and-spoke, mesh, or another known topology. In some embodiments, each NPU in a cluster can be connected to all other NPUs in the cluster. In various embodiments, synchronization network 109 can connect the NPUs into a hyper-square or ring-based topology, as disclosed in U.S. patent application Ser. No. 16/777,731, filed Jan. 30, 2020, and incorporated herein by reference in its entirety. A system including NPUs connected into a hyper-square or ring-based topology could implement advanced ring-based and tree-based synchronization algorithms, as described in U.S. patent application Ser. No. 16/777,771, filed Jan. 30, 2020, and U.S. patent application Ser. No. 16/777,683, filed Jan. 30, 2020, both incorporated herein by reference in their entireties.

Figure 1B:
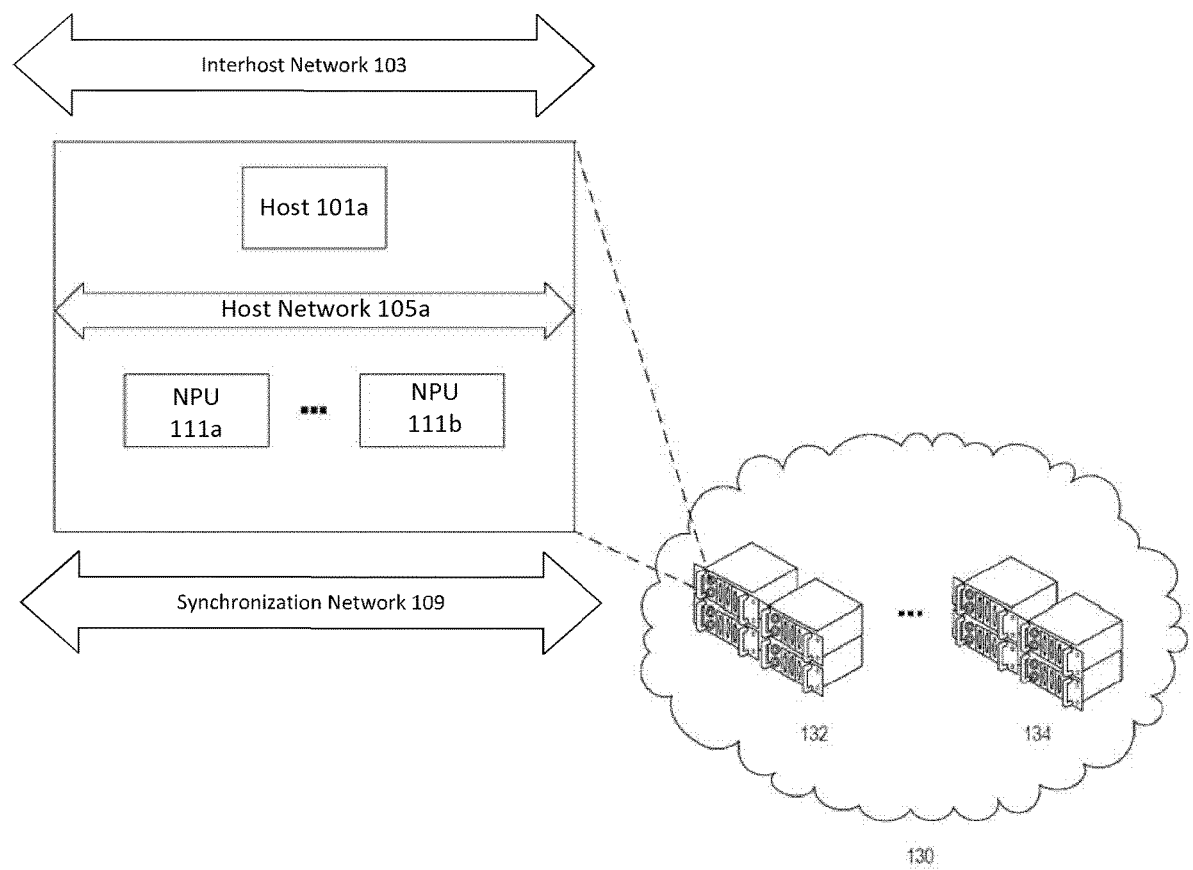
FIG. 1B depicts an exemplary cloud computing system including multiple computing servers, in accordance with some embodiments of the present disclosure.

FIG. 1B depicts an exemplary cloud computing system 130 including multiple computing servers (e.g., computing servers 132 and 134). Cloud computing system 130 can be configured and interconnected as described with regards to FIG. 1A. For example, as shown in FIG. 1B, a computing server 132 can, for example, be configured to communicate internally using host network 105a and externally using interhost network 103 and synchronization network 109. Host device 101a can be configured to control NPUs (e.g., NPU 111a and NPU 111b) using host network 105a and to communicate with other host devices using interhost network 103. NPUs in computing server 132 can be configured to communicate with each other and NPUs in other computing servers in cluster 130 (e.g., computing server 134) using synchronization network 109.

Cloud system 130 can provide a cloud service with artificial intelligence (AI) capabilities, including image recognition, facial recognition, translations, 3D modeling, and the like. It is appreciated that the NPUs disclosed herein can be deployed to computing devices in other forms. For example, such NPUs can also be integrated in a portable computing device, such as a laptop, smart phone, tablet, or wearable device.

Figure 1C:
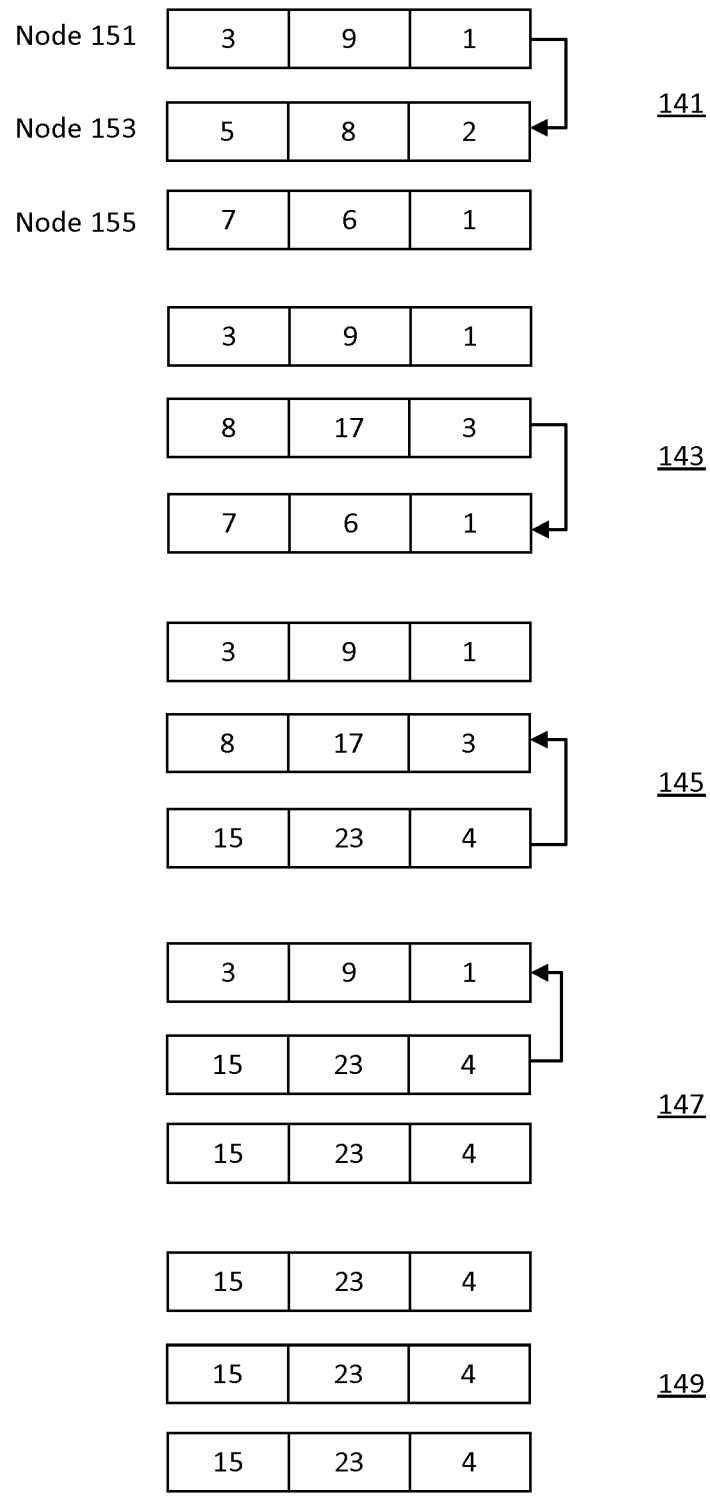
FIGS. 1C through 1E depict exemplary synchronization information exchanges, in accordance with some embodiments of the present disclosure.
Figure 1D:
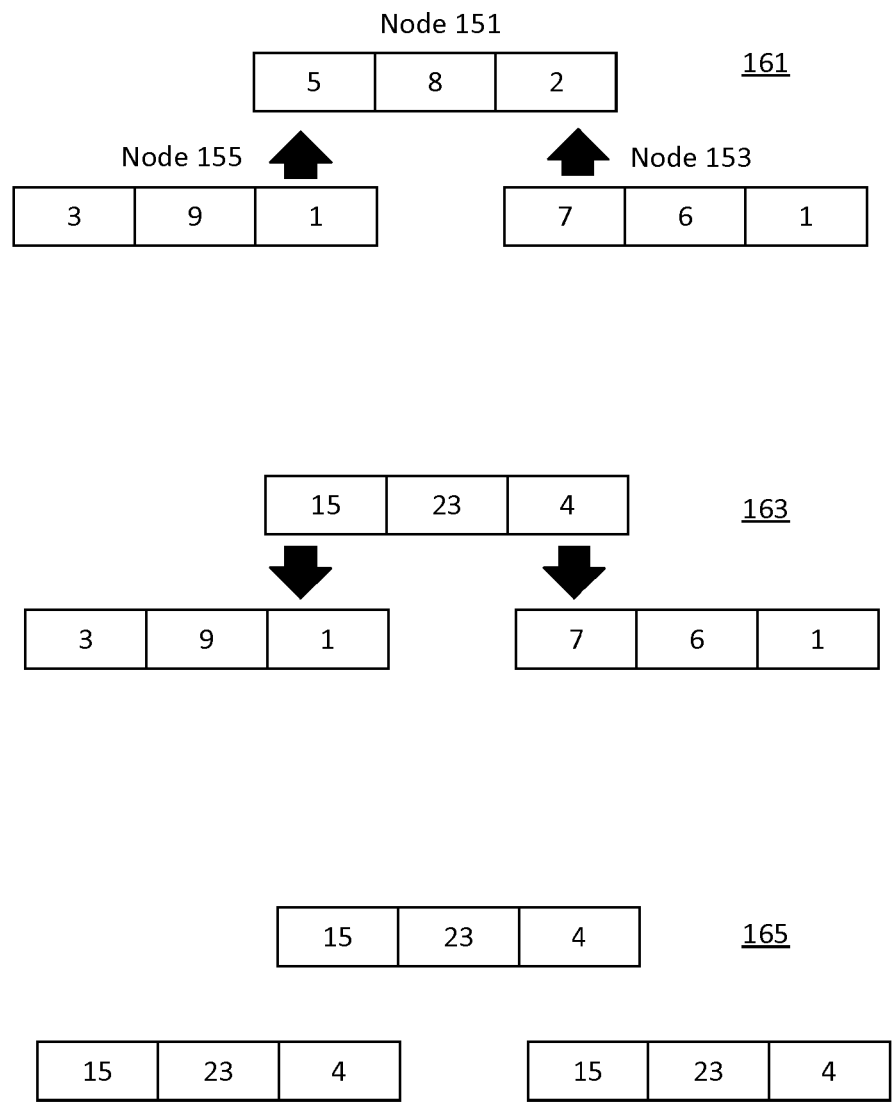

FIGS. 1C through 1D depict exemplary synchronization information exchanges, in accordance with disclosed embodiments. The synchronization information exchanges can be AllReduce exchanges including a reduction phase and a broadcast phase. Consistent with disclosed embodiments, distributed nodes (e.g., hardware accelerator, processors, or computing devices) may generate synchronization information. In the reduction phase, the synchronization information can be obtained from the distributed nodes. A value can then be generated from the obtained synchronization information. In a computation-along-propagation approach, obtaining the synchronization information and generating the value can be combined. For example, synchronization information can be modified as it passes between nodes, with each node transmitting an updated value generated using a local value and a received value. In the distribution phase, the value is broadcast to the distributed nodes. Consistent with disclosed embodiments, multiple values may be contemporaneously updated in this manner.

FIG. 1C depicts an exchange of synchronization information among three nodes (e.g., node 151, node 153, and node 155) arranged in a linear topology. In this non-limiting example, each node has generated three items of synchronization information (e.g., node 151 has generated the values "3", "9", and "1"). The reduction phase in this example includes steps 141 and 143 and the distribution phase includes steps 145 and 147. The state of the nodes following the AllReduce exchange is depicted in step 149.

In step 141, the synchronization information generated by node 151 can be provided by node 151 to node 153. In this computation-along-propagation example, the synchronization information received from node 151 can be added by node 153 to the synchronization information generated by node 153 to create updated synchronization information. While this simple example depicts accumulation of values, the disclosed embodiments are not so limited. Consistent with disclosed embodiments, other operations can be performed. In step 143, the updated synchronization information generated by node 153 can be provided by node 153 to node 155. The updated synchronization information received from node 153 can be added by node 155 to the synchronization information generated by node 155 to create final synchronization information. While this simple example depicts the final synchronization information as the sum of the synchronization information generated by the nodes, the disclosed embodiments are not so limited. Consistent with disclosed embodiments, the final synchronization information can be a function (e.g., a weighted or unweighted average, or the like) of the synchronization information.

In step 145, the final synchronization information can be distributed from node 155 to node 153. The final synchronization information received by node 153 can overwrite or otherwise replace the synchronization information stored by node 153. In step 147, the final synchronization information can be distributed from node 153 to node 151. The final synchronization information received by node 151 can overwrite or otherwise replace the synchronization information stored by node 151. In this manner, as shown in step 149, a state of all of the nodes can be synchronized.

FIG. 1D depicts an exchange of synchronization information among three nodes (e.g., node 151, node 153, and node 155) arranged in a tree topology. The reduction phase includes step 161, in which node 155 and node 153 pass synchronization information to node 151. The synchronization information generated by node 151 is then summed by node 151 with the received synchronization information to generate final synchronization information. While this example includes a two-level tree including a single root node (e.g., node 151) and two leaf nodes (e.g., nodes 155 and 153), the disclosed embodiments are not limited to such an arrangement. Consistent with disclosed embodiments, an AllReduce exchange over a tree topology could include more or fewer leaf nodes per root node, or additional levels in the tree (e.g., node 151 could be a child of another node, which in turn could be the child of another node, etc.). The distribution phase includes step 163, in which node 151 broadcasts the final synchronization information to nodes 155 and 153. The received final synchronization information can overwrite or otherwise replace the synchronization information stored by nodes 153 and 155. In this manner, as shown in step 165, a state of all of the nodes can be synchronized.

Figure 1E:
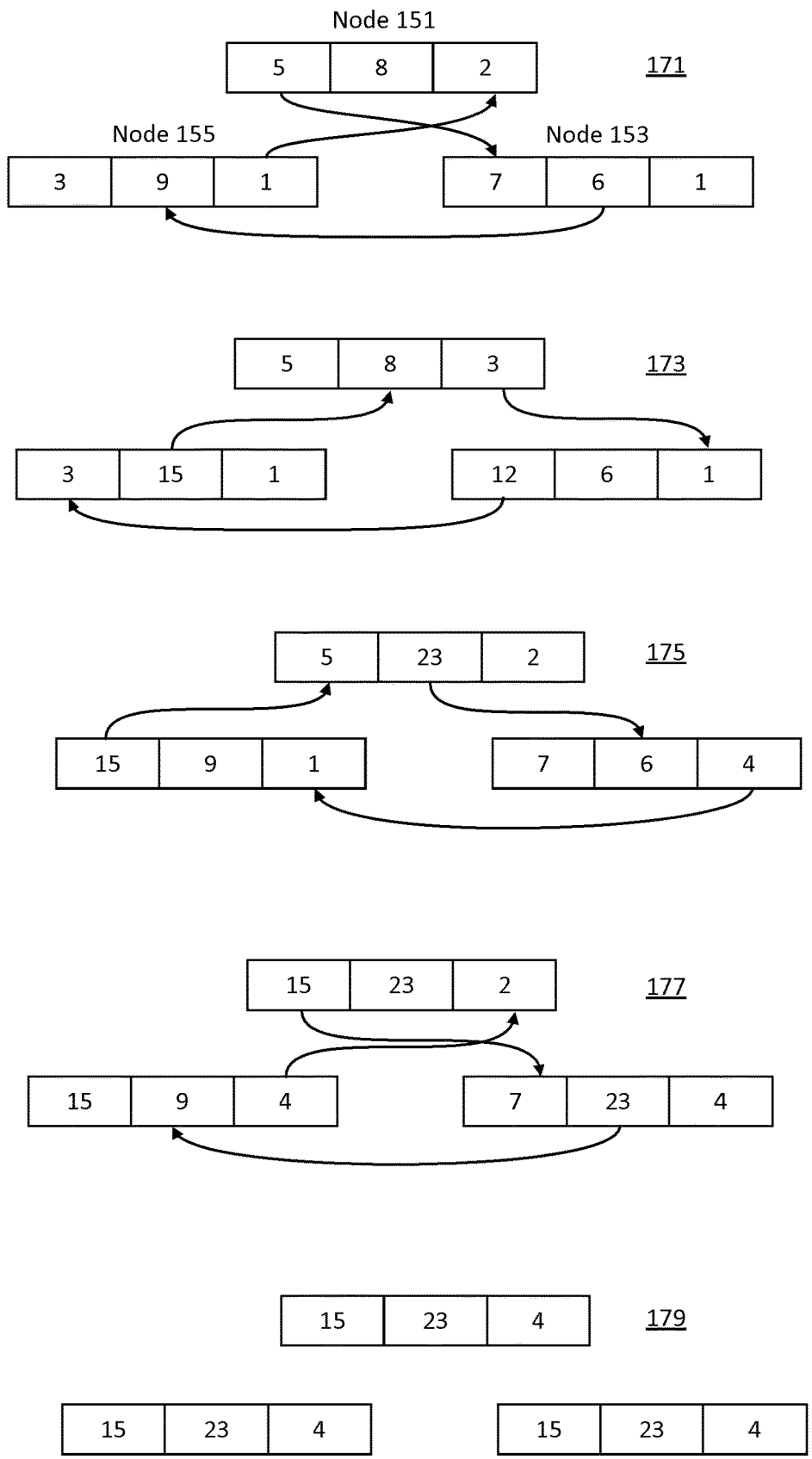

FIG. 1E depicts an exchange of synchronization information among three nodes (e.g., node 151, node 153, and node 155) arranged in a ring topology. As depicted in this example, given N nodes in such a ring, each node can communicate with two adjacent nodes in the ring 2*(N−1) times. During each communication, the node sends or receives synchronization information. In the first N−1 communications (e.g., steps 171 and 173), each node accumulates received synchronization information. In the second N−1 communications (e.g., steps 175 and 177), each node overwrites or replaced stored synchronization information with corresponding received synchronization information. In this manner, as shown in step 179, a state of all of the nodes can be synchronized.

Figure 2A:
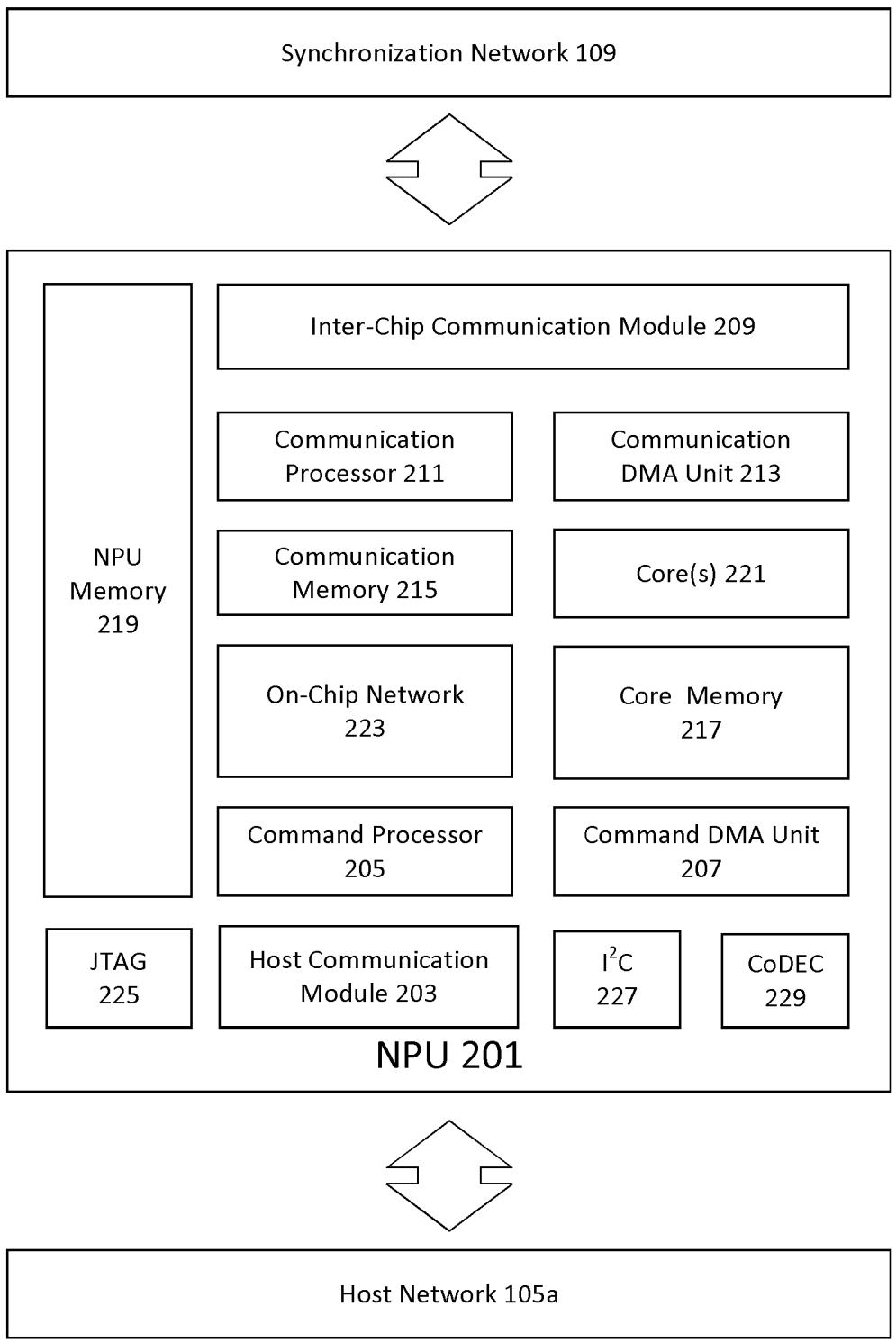
FIG. 2A depicts the logical components of an exemplary neural processing unit, in accordance with some embodiments of the present disclosure.

FIG. 2A depicts the logical components of an exemplary neural processing unit (NPU 201), in accordance with some embodiments of the present disclosure. NPU 201 can include generation components that support execution of a distributed ML task, such as computing core(s) 221, core memory 217, command processor 205, command DMA unit 207, and host communication module 203. NPU 201 can also include synchronization components that support synchronization of NPU 201 with other NPUs, such as an inter-chip communication module 209 (ICC module 209), a communication processor 211, a communication memory 215, and a communication DMA unit 213. NPU 201 can include an On-chip network 223 to enable communication between components of NPU 201, an NPU memory 219. In some embodiments, NPU 201 can include modules supporting additional debugging and communication functionality, such as a JTAG module 225, an I$^2$C module 227, and an on-chip encoder/decode for processing video and images (e.g., CoDEC 229). Consistent with disclosed embodiments, NPU 201 can be configured to support at least partially separate execution of an ML task and synchronization of NPU 201 with other devices. Such separation execution can support improved ML task performance and complexity reductions and performance improvements in computing clusters including such NPUs.

Host communication module 203 can be configured to support communication between NPU 201 and a host device (e.g., a CPU controlling the execution of one or more NPUs including NPU 201) using host network 105a. In some embodiments, host network 105a can be an (or the) inter-chip bus connecting components of a computing device. Host network 105a can be a PCI express bus and host communication module 203 can be a PCIe controller. Though described with respect to a PCI express bus and controller, other interfaces may be used (e.g., Infiniband, RapidIO, NVLink, bluelink, or the like) and the foregoing description is not intended to be limiting.

In some embodiments, NPU 201 can be configured to receive information (e.g. data or instructions) concerning an ML task from a host device (e.g., host 101a) using host communication module 203. When the ML task is a training task, the information can include training information, such as training instructions, ML model parameters (e.g., weights and biases for a neural network, or similar model parameters for other ML models), and training data (or training data locations, memory addresses, memory address ranges, or similar information enabling retrieval of the training data). The information can also include hyperparameters (e.g., learning rate, loss function, random seed, number of nearest neighbors, distance metric, kernel type, or other hyperparameters appropriate to the ML model being trained).

Command processor 205 can be configured to control performance of tasks by NPU 201. In some embodiments, command processor 205 can be configured to transfer information between a host device and NPU 201. For example, command processor 205 can obtain data or instructions from the host device. In some embodiments, command DMA unit 207 can obtain the data or instructions in response to instructions received from command processor 205 (e.g., DMA load/store instructions, or the like). In some instances, command processor 205 can process the obtained data or instructions. For example, command processor 205 can be configured using data or instructions obtained from a host device to manage performance of computations by core(s) 221. Such data or instructions can include training information for managing performance of a training task by a core. The training task can include generation of update information for a machine learning model. In various instances, command processor 205 can store the obtained data or instructions in NPU memory 219; core memory 217; caches, buffers, or memories included in core(s) 221; or another memory of NPU 201 (e.g., by providing instructions to command DMA 207). In various embodiments, command processor 205 can instruct one or more of core(s) 221 to perform computations according to previously stored instructions. In some embodiments, command processor 205 can, at least in part by providing a sequence of commands to other components of NPU 201, cause NPU 201 (or a set of one or more of core(s) 221) to perform a task in an ML task. Command processor 205 can be configured to contemporaneously provide multiple sequences of such commands, causing contemporaneously execution of multiple ML tasks (e.g., by multiple sets of one or more of core(s) 221).

In some embodiments, command processor 205 can interact with a host device under the supervision of a kernel mode driver (KMD). In some embodiments, command processor 205 can modify the commands to each of core(s) 221, to increase opportunities for core(s) 221 to work in parallel. The modified commands can be stored in an instruction buffer. In some embodiments, command processor 205 can be configured to coordinate one or more core(s) 221 for parallel execution.

Command DMA 207 can be a direct memory access controller configured to assist with transferring data between a memory associated with a host device and NPU 201. For example, command DMA 207 can assist with loading data or instructions from a memory associated with the host device into command processor 205; NPU memory 219; core memory 217; a cache, buffer, or memory included in the core; or another memory of NPU 201. In some embodiments, command DMA 207 can also assist with transferring data between multiple accelerators using the host network. Command DMA 207 can allow off-chip devices to access both on-chip and off-chip memory without causing an interrupt in a processor (e.g., a CPU or the like) of the host device. In addition, command DMA 207 can assist with transferring data between components of NPU 201. For example, command DMA 207 can assist with transferring data between ones of core(s) 221 or within one of core(s) 221. Thus, command DMA 207 can also generate memory addresses and initiate memory read or write cycles. Command DMA 207 also can contain several hardware registers that can be written and read by command processor 205 or core(s) 221, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst.

Inter-Chip Communication Module 209 (ICC module 209) can enable NPU 201 to exchange information (e.g., data or instructions) directly with other devices (e.g., other NPUs). Such information can be exchanged using a synchronization network. As described above with regards to FIG. 1A, such a synchronization network can be separate from a host network communicatively connecting NPU 201 and a host device and separate from an inter-host network connecting host devices. As described herein, ICC module 209 can be physically or logically divided into ports in some embodiments.

ICC module 209 can be configured, in some embodiments, to interact with other components of NPU 201 through communications memory 215. ICC module 209 can be configured to store data received from other devices in communications memory 215 or read data from communications memory 215 for transmission to other devices. As described herein, in some embodiments, communications memory 215 may include multiple physical or logical partitions, each partition corresponding to a port of ICC module 209. ICC module 209 can be configured to store information received by a port to (or read information for transmission thorough a port from) a corresponding partition in communications memory 215. In some embodiments, each serialization unit in ICC module 209 can correspond to one of the ports.

Communications Processor 211 can be configured to generate synchronization information, distribute synchronization information within NPU 201, or manage the exchange of synchronization information with other NPUs. Communications processor 211 can perform such generation, distribution, and management according to instructions received from at least one of a host device or command processor 205. Consistent with disclosed embodiments, communications processor 211 can provide sequence(s) of commands to other components of NPU 201 (e.g., communications DMA unit 213, ICC module 209, core(s) 221, or the like). Such commands, when executed by these other components of NPU 201, can cause them to provide data to communications processor 211 or exchange synchronization information with other NPUs.

Communications processor 211 can generate synchronization information using data obtained generated by NPU 201 (e.g., by one or more of core(s) 221) or received from another NPU. Communications processor 211 can obtain (e.g., using communication DMA unit 213) the data from a memory of NPU 201 (e.g., NPU memory 219, core memory 217, or communications memory 215). Communications processor 211 can generate synchronization information as part of a computation-along-propagation, as described herein. In embodiments in which ICC module 209 includes multiple ports, communications processor 211 can be configured with hardware or software resources dedicated to each of the ports in ICC module 209.

Communications processor 211 can distribute (e.g., using communication DMA unit 213) synchronization information between memories of NPU 201 (e.g., NPU memory 219, core memory 217, or communications memory 215). For example, communications processor 211 can obtain synchronization information from communication memory 215 and from NPU memory 219, generate updated synchronization information using the obtained information, and store the updated synchronization information into NPU memory 219 or core memory 217.

Communications processor 211 can manage the exchange of synchronization information with other NPUs by providing instructions to ICC module 209 or managing data stored in communication memory 215. For example, communications processor 211 can store synchronization information to communication memory 215 and cause ICC module 209 to transmit the stored synchronization information to another NPU. As an additional example, communications processor 211 can load (e.g., into communications processor 211) or distribute (e.g., into another memory of NPU 210) synchronization information received and stored into communication memory 215 by ICC module 209. To continue this example, communications processor 211 can load synchronization information from communication memory 215, generate updated synchronization information using the loaded synchronization information, write the updated synchronization information to communication memory 215, and cause ICC module 209 to transmit the updated synchronization information to another NPU.

Communications DMA 213 can be a direct memory access controller configured to assist with transferring data between ICC module 209 and other components of NPU 201. For example, communications DMA 207 can assist with transferring data or instructions from (or into) communications memory 215 into (or from) communications processor 211 or another memory in NPU 201 (e.g., NPU memory 219; core memory 217; a cache, buffer, or memory included in a core; or another memory of NPU 201). Similar to command DMA 207, communications DMA 213 can generate memory addresses and initiate memory read or write cycles. Communications DMA 213 also contains several hardware registers that can be written and read by communications processor 211 or core(s) 221, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst.

Communications memory 215 can be a memory configured to support synchronization of NPU 201 with other NPUs. Communications memory 215 can be accessible to at least one of communication processor 211 and inter-chip communication module 209 (e.g., using communication DMA unit 213). In some embodiments, communications memory 215 can be implemented using SRAM. In various embodiments, communications memory 215 can be logically or physically partitioned into blocks corresponding to ports of ICC module 209. In some embodiments, each block can be configured to store data or instructions received from (or provide stored data or instructions to) the corresponding port of ICC module 209. In some such embodiments, communications processor 211 can access all blocks of communications memory 215.

Core memory 217 can be a memory configured to provide core(s) 221 with higher-bandwidth or lower-latency data storage than NPU memory 219. In some embodiments, core memory 217 can be implemented using SRAM. In some embodiments, core memory 217 can be organized into caches or buffers for shared use by core(s) 221.

NPU memory 219 can be configured as a global memory for NPU 201. NPU memory 219 can be accessible to command processor 205 and core(s) 221 (e.g., using command DMA unit 207). NPU memory 219 can also be accessible to communication processor 211 and communication memory 215 (e.g., using communication DMA unit 213). NPU 201 can transfer data or instructions between command processor 205 or core(s) 221 and communication processor 211 or communication memory 215 using NPU memory 219. For example, NPU 201 can store instructions or data received from a host device or command processor 205 in NPU memory 219 (e.g., using command DMA unit 207). NPU 201 can then distribute the stored data or instructions to communication processor 211 or communication memory 215 (e.g., using communication DMA unit 213).

In some embodiments, NPU memory 219 can include multiple memory blocks. The memory blocks can be DRAM memory and can form an integrated package with core(s) 221 or other components of NPU 201. As a non-limiting example, NPU memory 219 can include eight blocks of on-chip, high-bandwidth memory (e.g., HBM2, or the like).

In some embodiments, NPU 201 can further include a memory controller (not shown) configured to manage data transmission between another component of NPU 201 (e.g., command DMA unit 207, communication DMA unit 213, or core(s) 221) and a specific memory block within NPU memory 219. The memory controller can generate memory addresses and initiate memory read or write cycles. The memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers. In some embodiments NPU 201 can include a memory controller for each memory block within NPU memory 219.

Core(s) 221 can include one or more processing elements for performing tasks, consistent with disclosed embodiments. A processing element may be or include a single instruction, multiple data (SIMD) architecture. Such an architecture may include one or more processing units configured to perform one or more operations (e.g., multiplication, complex multiplication, addition, multiply-accumulate, etc.) based on commands received from command processor 704. Core(s) 221 can be communicatively coupled with each other directly or through on-chip network 223. As a non-limiting example of a direct connection, core(s) 221 can be directly connected using a single directional ring bus (or another configuration suitable for efficient pipelining of neural network training or inference tasks). Core(s) 221 can be configured to perform operations in accordance with instructions. The instructions can be obtained by Core(s) 221 from command processor 205, a host device, or an instruction buffer in a memory of NPU 201 (e.g., NPU memory 219; core memory 217; or another memory of NPU 201).

On-chip network 223 can be a network configured to communicatively connect at least some of the components of NPU 201. On-chip network 223 can convey data or instructions between such communicatively connected components of NPU 201. In some embodiments, on-chip network 223 can be a packet-switched network. The disclosed embodiments are not limited to a particular implementation of on-chip network 223.

JTAG 225 can be or include a JTAG/TAP controller, which can specify a dedicated debug port implementing a serial communications interface (e.g., a JTAG interface) for low-overhead access to NPU 201 without requiring direct external access to the system address and data buses. JTAG 225 can also have on-chip test access port interface (e.g., a TAP interface) that implements a protocol to access a set of test registers that present chip logic levels and device capabilities of various parts.

I²C 227 can be a serial communications bus controller. When connected to an appropriately configured serial communication bus of a computing device (e.g., an I²C bus), I²C 227 can enable communication between NPU 201 and other components of the computing device connected to the serial communication bus (e.g., off-chip memory or peripherals).

CoDEC 229 can be an encoder/decoder. CoDEC 229 can be configured to perform image or video compression and decompression. NPU 201 can be configured to use CoDEC 229 to communicate image or video between NPU 201 and a host device using the host network. For example, NPU 201 can be configured to use CoDEC 229 to decompress image or video data received from the host device or to compress image or video data prior to transmission to the host device. In this manner, CoDEC 229 reduce the host network bandwidth requirements for processing image or video data using NPU 201.

The depicted assortment of components in FIG. 2A is not intended to be limiting. A number of depicted components can be combined into a smaller number of components (or a smaller number of depicted components divided into a larger number of components) having equivalent functionality. In some embodiments, for example, communication memory 215 can be combined into NPU memory 219 or core memory 217. Similarly, a processor may combine the functionality of communications process 211 and command processor 204, or a DMA unit may combine the functionality of communications DMA unit 213 and command DMA unit 207. In various embodiments, for example, inter-chip module 209 may be divided into multiple modules, each associated with a separate processor and communications memory. Certain functionality may not be present in some embodiments. For example, NPU memory 219, JTAG model 225, I²C modules 227, or CoDEC 229 may be absent.

Furthermore, while described above as including multiple blocks of on-chip memory, NPU memory 219 is not limited to such an architecture. NPU memory 219 can alternatively be formed as a single memory block or include off-chip memory (e.g., DDR/GDDR memory, or the like).

Figure 2B:
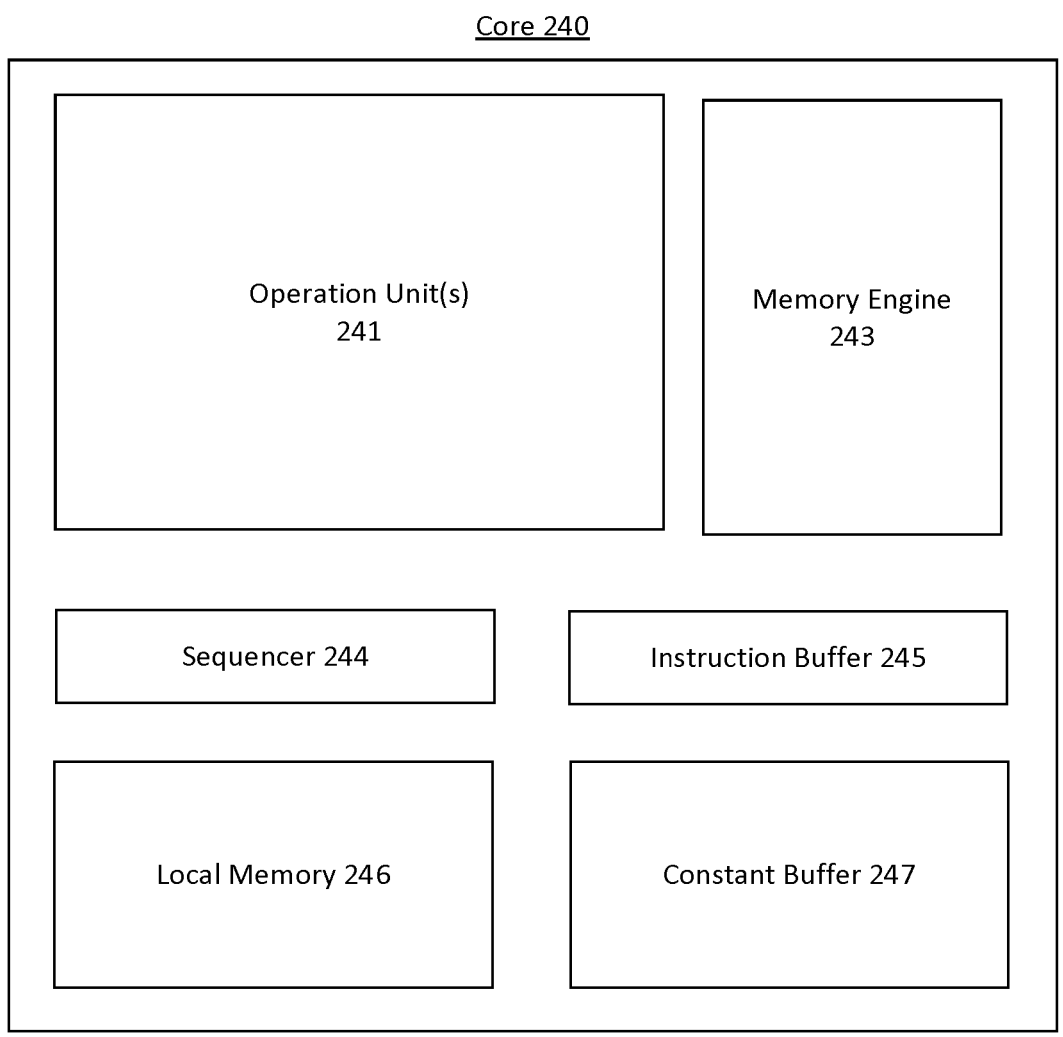
FIG. 2B depicts an exemplary core architecture, in accordance with some embodiments of the present disclosure.

FIG. 2B illustrates an exemplary architecture of core 240 (e.g., one of core(s) 221), in accordance with some embodiments of the present disclosure. As shown in FIG. 2B, core 240 can include operation unit(s) 241, a memory engine 243, a sequencer 224, an instruction buffer 245, a constant buffer 247, a local memory 246, or the like. The depicted architecture is not intended to be limiting, as the disclosed systems and methods can be used with other core architectures.

Operation unit(s) 241 can include one or more processing units configured to perform operations on received data (e.g., feature maps of a neural network). The operations can include multiplication, complex multiplication, addition, multiply-accumulate, element-wise operation, or similar operations. In some embodiments, operation unit(s) 241 can be configured to accelerate execution of convolution operations or matrix multiplication operations. The operations can further include resizing operations (e.g., pooling, unpooling, up or down sampling, or like operations), region-of-interest (ROI) operations, and the like. In some embodiments, operation unit(s) 241 can include a resizing unit, a pooling data path, and the like.

Memory engine 243 can be configured to perform a data copy within core 240 or between core 240 and another core. In some embodiments, memory engine 243 can be assisted by a DMA unit of NPU 201 (e.g., command DMA unit 207 or communications DMA unit 213) For example, such a DMA unit can (e.g., in response to instructions from memory engine 243) perform a data copy from a local memory (e.g., local memory 246 of FIG. 2B) into operation unit(s) 241 or another core. In some embodiments, memory engine 243 can be configured to perform matrix transposition to make a matrix suitable for use in the operation unit.

Sequencer 244 can be coupled with instruction buffer 245 and configured to retrieve commands and distribute the commands to components of core 240. For example, sequencer 244 can distribute operation commands (e.g., convolution commands, multiplication commands, pooling commands, or the like) to operation unit(s) 241 or data copy commands to memory engine 243. Sequencer 244 can also be configured to monitor execution of a neural network task and parallelize sub-tasks of the neural network task to improve efficiency of the execution. In some embodiments, operation unit(s) 241 and memory engine 243 can run in parallel under control of sequencer 244 according to instructions stored in instruction buffer 245.

Instruction buffer 245 can be configured to store instructions for core 240. In some embodiments, instruction buffer 245 is coupled with sequencer 244 and provides instructions to the sequencer 244. In some embodiments, instructions stored in instruction buffer 244 can be transferred or modified by command processor 205.

Constant buffer 247 can be configured to store constant values. In some embodiments, constant values stored in constant buffer 247 can be used by operation unit(s) 241 for batch normalization, quantization, de-quantization, or the like.

Local memory 246 can provide storage space with fast read/write speed. Local memory 246 can be part of core memory 217 or can be separate from core memory 217. A size of local memory 246 can be determined based on on-chip space requirements and the data access requirements of core 240 during expected use. This size can be determined to reduce the frequency of data access requests to NPU memory 219. In this manner, data access latencies can be reduced. In some embodiments, local memory 246 can have a capacity of at least 100 MB. In some embodiments, local memory 246 can be implemented using SRAM to minimize data loading latency and energy consumption or evenly distributed on chip to relieve dense wiring and heating issues.

Figure 3A:
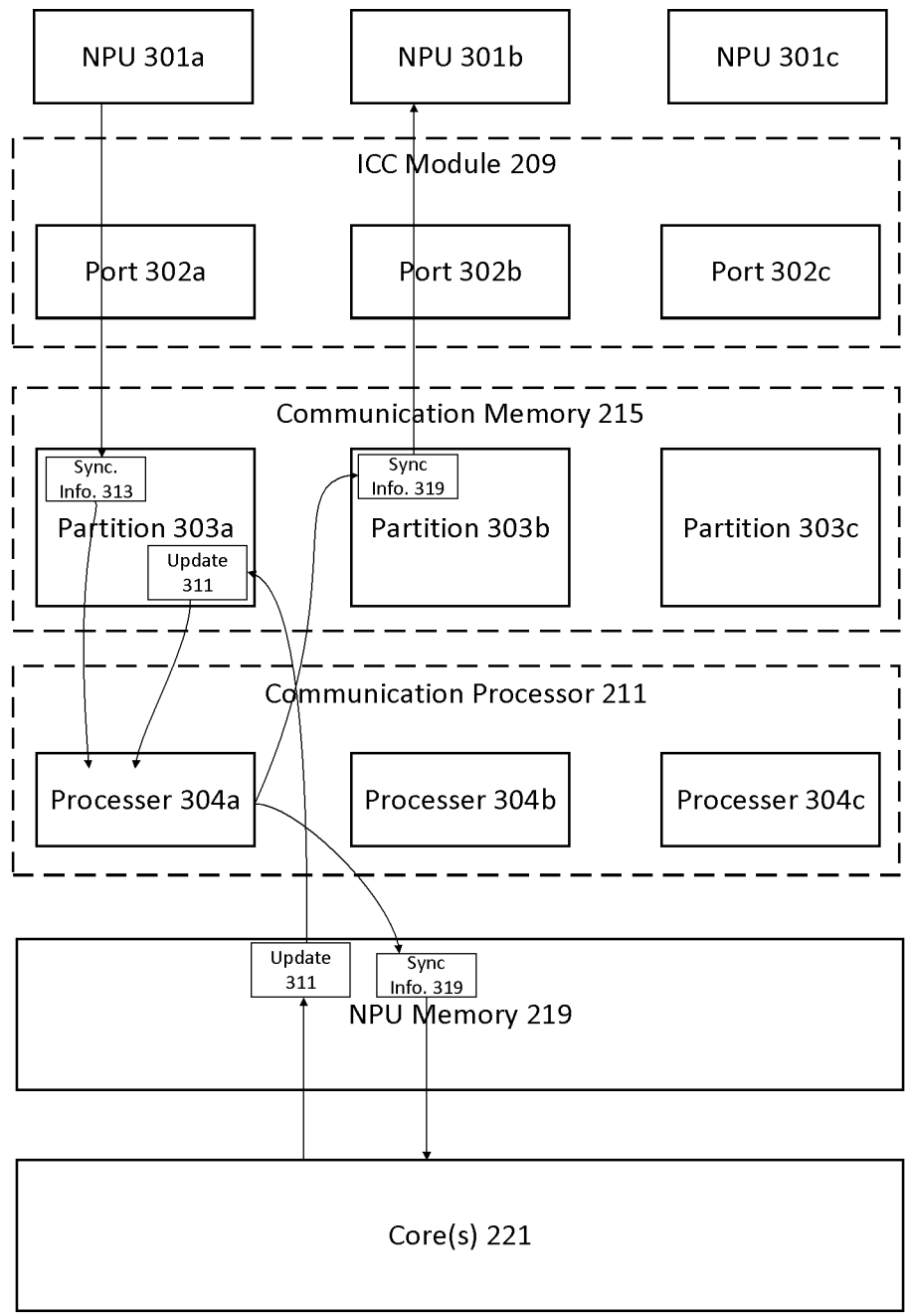
FIGS. 3A and 3B depict exemplary processes for synchronizing updates between exemplary neural processing units, in accordance with some embodiments of the present disclosure.
Figure 3B:
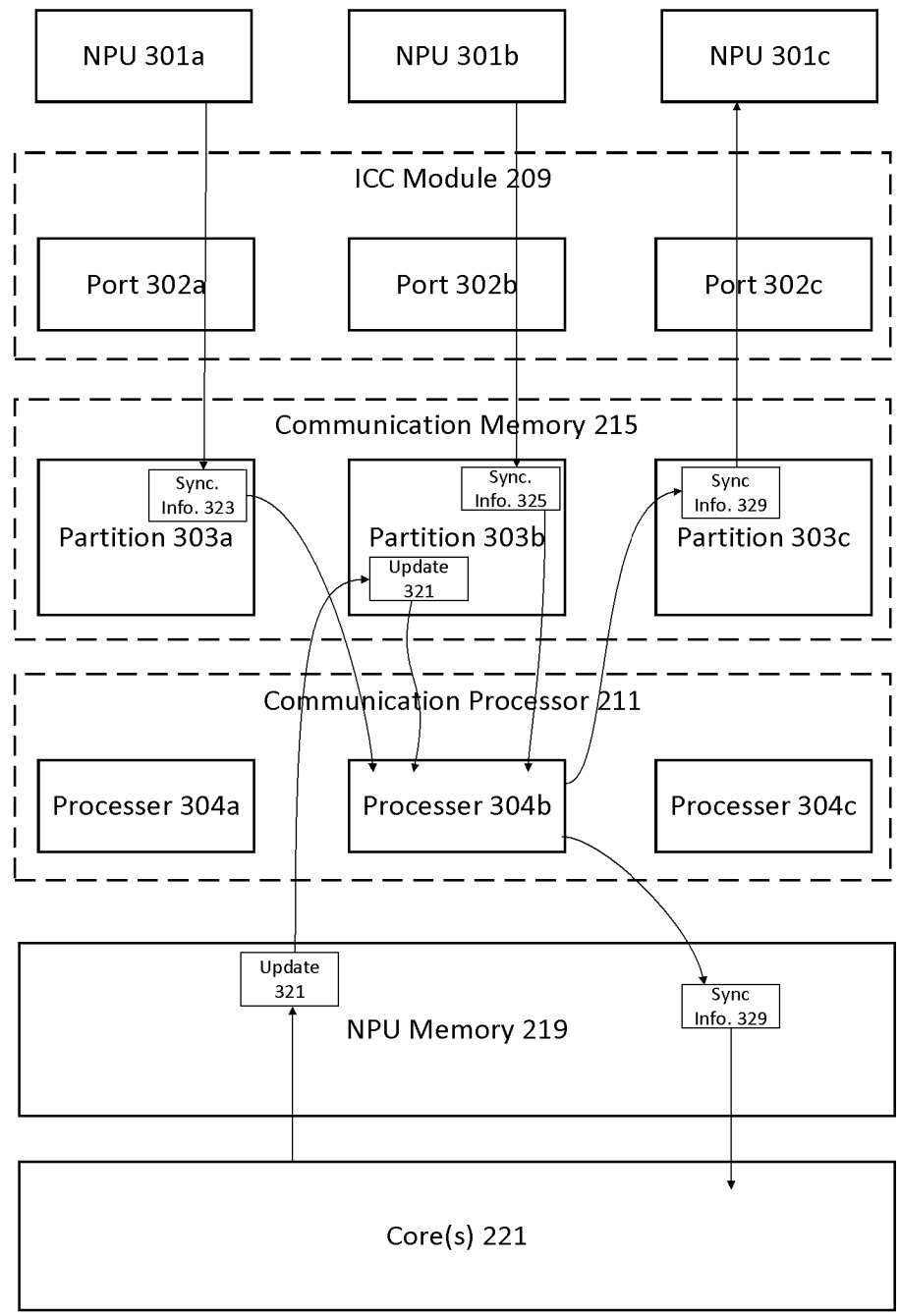

FIGS. 3A and 3B depict exemplary processes for synchronizing updates between exemplary neural processing units, in accordance with some embodiments of the present disclosure. These processes can involve the exchange of synchronization information between exemplary NPU 201 and other NPUs (e.g., NPU 301a, NPU 301b, NPU 301c, or the like). NPU 201 can be configured to generate or exchange synchronization information using ICC module 209, communication memory 215, communication processor 211, NPU memory 219, and core(s) 221. NPU 201 can be so configured in accordance with commands provide by command processor 205, a host device, or the like. The commands can be received directly from command processor 205, the host device, or the like, or from one or more instruction buffers in NPU 201 configured to store such commands.

In the non-limiting embodiment depicted in FIGS. 3A and 3B, ICC module 209, communication memory 215 and communication processor 211 each contain logical or physical subcomponents. ICC module 209 can include ports (e.g., port 302a, port 302b, and port 302c as shown). In some embodiments, each port can correspond to another NPU (e.g., NPU 301a, NPU 301b, NPU 301c, or the like). Communications memory 215 can include partitions (e.g., Partition 303a, Partition 303b, Partition 303c as shown). Each partition can correspond to a port included in ICC module 209. In some embodiments (as depicted in FIGS. 3A and 3B), communication processor 211 can include multiple processors (processer 302a, processer 302b, and processer 302c as shown). Each of the multiple processors can execute a process for generating synchronization information or managing interactions with a port included in ICC module 209. In this manner, the ports, partitions, and processor depicted in FIGS. 3A and 3B can interact consistent with disclosed embodiments to generate and exchange synchronization information between NPU 201 and other NPUs. This generation and exchange of synchronization information can occur largely in parallel with the execution of ML tasks by NPU 201, potentially enabling more rapid execution of ML tasks and improving the overall performance of NPU 201.

The ports in ICC module 209 can be implemented using hardware, software, or a combination of hardware and software. Each port can support a communication link with another device (e.g., another NPU) using a synchronization network (e.g., synchronization network 109). ICC module 209 may include 1, 2, 4, 8, or more ports, depending on the architecture or data transmission requirements of the NPU. For example, an NPU with six ports might support a more complex synchronization network (and potentially faster or more compute- or memory-efficient synchronization) than an NPU with four ports). In some embodiments, the communication link can be a point-to-point connection (e.g., a connection between communication endpoints without intervening routing or switching). In various embodiments, the communication link can be a serial connection. Each port can include a certain number of lanes (e.g., a number of lanes between 1 and 32, or greater, depending on the architecture or data transmission requirements of the NPU). For example, each port may include 8 lanes. Each lane can be implemented as a pair of unidirectional serial data links (e.g., two unidirectional differential conductor pairs, or the like). ICC module 209 can include serialization units that support serialization/deserialization of transmitted data (e.g., data can be converted from parallel to series for transmission or converted from series to parallel upon reception).

Communication processor 211 can enable performance of the processes depicted in FIGS. 3A and 3B (e.g., process 310, process 320, and process 330). In some embodiments, communication processor 211 can enable performance of these processes using hardware or software resources dedicated to each of the ports in ICC module 209. For example, communications processor 211 can include multiple processors, each running a process for managing a corresponding port in ICC module 209 (e.g., checking for received values, providing instructions to transmit values stored in communications memory 215, configuring the port to communicate with a particular NPU, or the like). As an additional example, communications processor 211 can include a single processor running multiple concurrent processes, each for managing a corresponding port in ICC module 209. In some embodiments, communications processor 211 can include one or more arithmetic logic units (ALUs) for processing synchronization information. In some embodiments, each port in ICC module 209 can have a corresponding dedicated ALU in communications processor 211.

The partitions in communications memory 215 can be implemented using hardware, software, or a combination of hardware and software. For example, NPU 201 can implement communication memory 215 using include multiple separate on-chip memories. Each separate memory can correspond to a partition. As an additional example, NPU 201 can implement communication memory 215 using fewer separate on-chip memories than partitions (e.g., a single on-chip memory and two partitions). In such implementations, at least two partitions can be realized as logical partitions in a single physical memory. In some embodiments, a port in ICC module 209 can be configured to read and write synchronization information from a corresponding partition in communication memory 215. In some implementations, each port in ICC module 209 may only be able to access the corresponding partition in communication memory 215. In some embodiments, all processes executed by communication processor 211 can read from or write to all partitions in communications memory 215.

A part of the processes depicted in FIGS. 3A and 3B, core(s) 221 can generate synchronization information (e.g., update 311, or the like) during performance of ML tasks. For example, core(s) 221 can perform a training task on a deep learning neural network using a batch of training data, thereby generating a loss function gradient for updating the parameters of the neural network. In this non-limiting example, the generated synchronization information can be, be part of, or include this loss function gradient. In some embodiments, NPU memory 219 can be used to transfer the generated synchronization information from generating components (e.g., core(s) 221, command processor 205, core memory 217, or the lie) core(s) 221 to synchronization components of NPU 201 (e.g., communication processor 211, communication memory 215, ICC module 209, or the like). In such embodiments, synchronization information can be exchanged between the generating components and the synchronization components using NPU 219 because the generating components may not be directly accessible to the synchronization components. Mediating data exchange between the generating components and the synchronization components in this manner may reduce interference of the synchronization components in the performance of the ML tasks, thereby improving the performance of the system.

FIG. 3A depicts an exemplary compute-along-propagation synchronization process 310, consistent with disclosed embodiments. In some embodiments, process 310 can be performed in accordance with or in response to, instructions provided by communication processor 211 (e.g., by a process running on processor 304a). Process 310 can be performed as part of an AllReduce exchange (e.g., process 310 can implement step 175 of the AllReduce exchange depicted in FIG. 1E). As part of process 310, core(s) 211 can perform a ML task, generating update 311, which can be stored in NPU memory 219 (e.g., using command DMA unit 207). In some embodiments, update 311 can be transferred to a memory partition (e.g., partition 303a) of communications memory 215. Synchronization information 313 can be received from NPU 301a using a corresponding port of ICC module 209 (e.g., port 302a). Synchronization information 313 can be written to partition 303a (e.g., directly by port 302a, using communication DMA unit 213, or a similar method). Update 311 and synchronization information 313 to be loaded into processor 304b (e.g., by communications DMA unit 213 in response to instructions received from communications processor 211, or in a similar manner). In some embodiments, update 311 can be loaded directly from NPU memory 219. Processor 304*b* can generate synchronization information 319 (e.g., by performing logical or arithmetic operations using update 311 and synchronization information 313). Synchronization information 319 can then be written to partition 303*b* (e.g., using communication DMA unit 213, or a similar method) of communication memory 215. Port 302*b* can then obtain synchronization information 319 (directly by port 302*b*, using communication DMA unit 213, or a similar method) and transmit synchronization information 319 to NPU 301*b*.

In some instances, synchronization information 319 can be the synchronization information used by the NPUs to update their states (e.g., as in step 175 of FIG. 1C). In such instances, synchronization information 319 can also be written to NPU memory 219 (e.g., using communication DMA unit 213, or a similar method). Synchronization information 319 can subsequently be accessed by core(s) 221 for use in a ML task (e.g., using command DMA 207, or the like). Additionally, NPU 301*b* can update its state using synchronization information 319 received from NPU 201. NPU 301*b* may also transmit synchronization information 319 to another NPU.

In various instances (not depicted in FIG. 3A), after providing synchronization information 319 to NPU 301*b*, NPU 201 can receive from NPU 301*b* synchronization information for updating its state (e.g., as described with regards to step 147 in FIG. 1C). Port 302*b* can store this received synchronization information in partition 303*b* in accordance with instructions provided by a process executing on processor 304*b*. The received synchronization information can be copied to NPU 219 and subsequently be accessed by core(s) 221 for use in a ML task. The received synchronization information can also be copied to partition 303*a* (e.g., in accordance with instructions provided by the process executing on processor 304*b*). Port 302*a* can then transmit this synchronization information to NPU 301*a*, respectively.

FIG. 3B depicts an exemplary compute-along-propagation synchronization process 320, consistent with disclosed embodiments. In some embodiments, process 320 can be performed in accordance with or in response to, instructions provided by communication processor 211 (e.g., by a process running on processor 304*b*). Process 320 can be performed as part of an AllReduce exchange. As a non-limiting example, NPU 201 can be an intermediate node in a tree of nodes. NPU 201 can be configured to receive synchronization information from to child nodes in the tree (e.g., NPU 301*a* and NPU 301*b*), generate updated synchronization information based on the received synchronization information, and provide the updated synchronization information to a parent node in the tree. As part of process 320, core(s) 211 can perform a ML task, generating update 321, which can be stored in NPU memory 219 (e.g., using command DMA unit 207). In some embodiments, update 321 can be transferred to a memory partition (e.g., partition 303*a*) of communications memory 215. Synchronization information 323 can be received from NPU 301*a* using a corresponding port of ICC module 209 (e.g., port 302*a*). Synchronization information 323 can be written to partition 303*a* (e.g., directly by port 302*a*, using communication DMA unit 213, or a similar method). Synchronization information 325 can be received from NPU 301*b* using a corresponding port of ICC module 209 (e.g., port 302*b*). Synchronization information 325 can be written to partition 303*b* (e.g., directly by port 302*b*, using communication DMA unit 213, or a similar method). Update 321, synchronization information 323, and synchronization information 325 to be loaded into processor 304*b* (e.g., by communications DMA unit 213 in response to instructions received from communications processor 211, or in a similar manner). In some embodiments, update 321 can be loaded directly from NPU memory 219. Communications processor 211 can generate synchronization information 329 (e.g., by performing logical or arithmetic operations using update 311 and synchronization information 313). Synchronization information 329 can then be written to partition 303*c* (e.g., using communication DMA unit 213, or a similar method) of communication memory 215. Port 302*c* can then obtain synchronization information 329 (directly by port 302*c*, using communication DMA unit 213, or a similar method) and transmit synchronization information 329 to NPU 301*c* (e.g., the parent node in the tree).

In some instances (as shown in FIG. 3B), synchronization information 329 can be the synchronization information used by the NPUs to update their states (e.g., as in step 163 of FIG. 1D). In such instances, synchronization information 329 can be written to NPU memory 219 (e.g., using communication DMA unit 213). Synchronization information 329 can subsequently be accessed by core(s) 221 for use in a ML task (e.g., using command DMA 207, or the like). In some such instances (not shown in FIG. 3B), rather than writing synchronization information 329 to partition 303*c*, synchronization information 329 can be written to partition 303*a* and partition 303*b*. Port 302*a* and port 302*b* can then obtain synchronization information 329 from partition 303*a* and partition 303*b* and transmit this synchronization information to NPU 301*a* and NPU 301*b* (e.g., the child nodes in the tree), respectively.

In various instances (not shown in FIG. 3B), after providing synchronization information 329 to NPU 301*c*, NPU 201 can receive from NPU 301*c* synchronization information for updating its state. Port 302*c* can store this received synchronization information in partition 303*c* in accordance with instructions provided by a process executing on processor 304*c*. The received synchronization information can be copied to NPU 219 and subsequently be accessed by core(s) 221 for use in a ML task. The received synchronization information can also be copied to partition 303*a* and partition 303*b* (e.g., in accordance with instructions provided by the process executing on processor 304*c*). Port 302*a* and port 302*b* can then transmit this synchronization information to NPU 301*a* and 301*b*, respectively.

As can be appreciated from the foregoing description, NPU 201 is not limited to a particular synchronization topology or synchronization process. Instead, connections between NPUs in a cluster can depend on how the NPUs are connected using a synchronization network (e.g., synchronization network 109). This topology can depend in turn on the number of connections supported by each NPU (e.g., the number of ports supported by each ICC module). In some embodiments, a program executing on a computing cluster formed from multiple NPUs may specify how synchronization information is passed between such connected NPUs.

As described above with regards to FIGS. 3A and 3B, synchronization information exchanged between NPUs can be used by core(s) in a ML task. In some embodiments, the synchronization information can be used to update a state of the NPU. This state can be maintained in NPU memory 219, core memory 217, or memories in each of core(s) 221. The synchronization information can be used to overwrite or update that state. For example, the state can include a version of a machine learning model and the synchronization information can be used to overwrite or update that version of the machine learning model. To continue this example, the state can be or include neural network weights and biases and synchronization information can be a loss function gradient used to update these neural network weights and biases.

Figure 4:
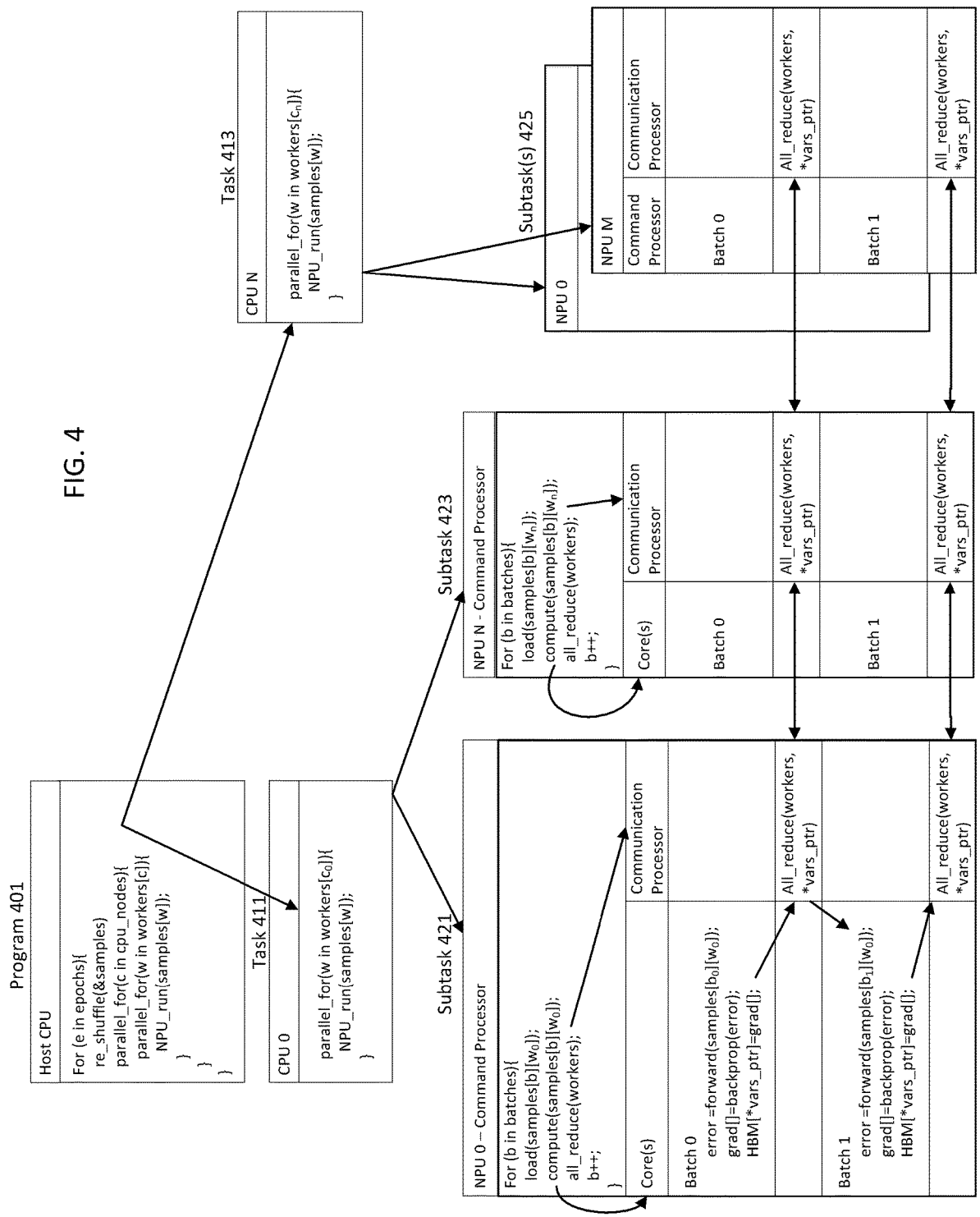
FIG. 4 depicts distribution of a training task across exemplary central processing units, and across neural processing units associated with each exemplary central processing unit, consistent with embodiments of the present disclosure.

FIG. 4 depicts distribution of a training task across exemplary central processing units, and across neural processing units associated with each exemplary central processing unit, consistent with embodiments of the present disclosure. The training task can be executed or interpreted (e.g., "performed") by a system including multiple central processing units, consistent with disclosed embodiments. At least one neural processing unit can be associated with each central processing unit. The neural processing units of the system can be configured to perform a synchronization task by exchanging synchronization information using a synchronization network. In this manner, the system can enable faster and more efficient performance of the machine-learning task.

Program 401 specifies performance of the training task, consistent with disclosed embodiments. In some embodiments, the system can be configured to modify program 401 to support performance of the synchronization task. In this example, the training task includes training a neural network using a mini-batch stochastic gradient descent approach. However, the disclosed embodiments are not so limited.

Program 401 can be performed by host CPU of a computing system, in accordance with some embodiments of the present disclosure. The computing system can, in some embodiments, include other central processing units (e.g., the computing system can be computing cluster, cloud computing system, or the like). In various embodiments, the computing system can be communicatively connected to other central processing units (e.g., the computing system can be a user device, such as a tablet, laptop, desktop, or the like, communicatively connected to a computing cluster, cloud computing system, or the like). In various embodiments, the host CPU can distribute performance of the training task to other CPUs. However, the disclosed embodiments are not so limited. In some embodiments, the host CPU can be associated with NPUs and can participate in the performance of the training task (e.g., the host CPU and CPU 0 depicted in FIG. 4 can be the same CPU).

As a non-limiting example, program 401 can specify the following training task:

```
For (e in epochs){
    re_shuffle(&samples)
    parallel_for(c in cpu_nodes){
        parallel_for(w in workers[c]){
            NPU_run(samples[w]);
        }
    }
}
```

Program 401 specifies that the training task is performed for a set of epochs. In each epoch, the training data will be reshuffled and training runs (e.g., NPU run) performed using differing sets of samples. Program 401 specifies that the training runs will be performed in parallel by each of a set of central processing units (e.g., the central processors identified in "cpu_nodes"). Furthermore, program 401 specifies that the training runs will be performed in parallel by each of a set of workers (e.g., each NPU) associated with each of the central processing units.

Consistent with disclosed embodiments, the computing system can generate a set of tasks for performance by central processing units (e.g., task 411, task 413). Each task can be adapted for performance by a CPU. In this non-limiting example, task 411 can be adapted for performance by CPU 0 (which may be the host CPU in some embodiments):

```
parallel_for(w in workers[c_0]){
    NPU_run(samples[w]);
}
```

In this example, the task specifies that the training runs be performed in parallel over the workers (e.g., NPUs) associated with CPU 0 (e.g., w in workers[co]). Each training run can be performed by a worker using training data associated with that worker (e.g., samples[w]). Consistent with disclosed embodiments, the sets of training data associated with each worker can be disjoint or overlapping. The disclosed embodiments are not limited to any particular method of associating training data with a worker.

Consistent with disclosed embodiments, each CPU can generate a set of subtasks for performance by the workers (e.g., NPUs) associated with that CPU. For example, CPU 0 can generate subtask 421 and subtask 423, while CPU N can generate subtask(s) 425. In this non-limiting example, as shown below, a subtask can divide performance of a training run over a set of samples w into batches:

```
For (b in batches){
    load(samples[b][w_0]);
    compute(samples[b][w_0]);
    all_reduce(workers);
    b++;
}
```

In this example, the subtask specifies that a worker loads the training data corresponding to that combination of batch and worker (e.g., load(samples[b][$w_0$]) for worker $w_0$). The worker then computes a loss using the loaded training data and a stored neural network model (e.g., compute(samples ([b][$w_0$]). An all-reduce task is then performed, exchanging synchronization information to synchronize each worker with each other worker in the overall set of workers (e.g., all reduce(workers)). In this non-limiting example, the loss information can be combined to generate an average loss. The stored neural network model used by each worker can then be updated based on the average loss. In this manner, the stored neural network models used by all workers remain synchronized.

Consistent with disclosed embodiments, the workers can be NPUs. A command processor of the NPU can perform the instructions included in a subtask. In some embodiments, the command processor can be configured to support execution of multiple independent subtasks. To continue the prior example, in response to the "load(samples[b][$w_0$]" instruction, the command processor can issue a DMA-LOAD command to a command DMA unit. The DMA-LOAD command can cause the command DMA unit to obtain the specified training data (e.g., from a memory external to the NPU or a memory of the NPU) and load the specified samples into a memory associated with at least one core of the NPU (e.g., a shared core memory, a memory specific to the core, or the like). To continue this example, in response to the "compute(samples([b][$w_0$])" instruction, the command processor can start a COMPUTE task on at least one core of the NPU. In some embodiments, starting a COMPUTE task can include configuring the at least one core to perform the compute task using the training data. The command processor can also, in response to the "all reduce (workers)" instruction, issue an all-reduce command to the communications processor of the NPU. In some embodiments, issuing the all-reduce command can include configuring the communications processor to perform the appropriate all-reduce task.

Consistent with disclosed embodiments, response to the initiation of the COMPUTE task, the at least one core of the NPU can determine synchronization information (e.g., loss information) for synchronizing the NPUs. For example, in response to the first initiation of the compute task, the at least one core can perform the following operations:
error=forward(samples[$b_o$] [$w_o$]);
grad[ ]=backprop(error);
HBM[*vars_ptd]=grad[ ];

In this non-limiting example, the at least one core calculates an error using the training data corresponding to a combination of batch and NPU; calculates a gradient based on the error information; and stores the gradient to a location in a main memory of the NPU (e.g., NPU memory 219, or the like).

In some embodiments, multiple cores can be configured to collectively determine the gradient. For example, multiple errors can be generated by multiple cores using training data corresponding to a combination of core, batch, and NPU. In some embodiments, an additional core can obtain the multiple errors (e.g., pipelined from the multiple cores, from a memory, or the like) and calculate the gradient.

In some embodiments, after completion of the COMPUTE task (e.g., immediately upon completion or some time after completion), the communication processor of the NPU can perform an AllReduce task. As a non-limiting example:

```
REG[x]=get_reduce_dest(LOCAL_ID);
REG[y]=get_brdcast_dest(LOCAL_ID);
var_local=HBM(var);
if (!is_first_node[ ]){
    while(!receive(&var, flag_id));
    var+=var_local;
}
if (!is_last_node[ ])
    send(var, port[Reg[x]], flag_id);
if (is_last_node[ ])
    reduced = var / N;
if (!is_last_node[ ]){
    while(!receive(&reduced, flag_id_2));
    HBM[var]=reduced;
}
send(reduced, port[Reg[y]], flag_id_2);
```

In some embodiments, the communication processor can process these exemplary instructions to implement the All-Reduce exchange depicted in FIG. 1C. In some embodiments, the communication processor can use DMA commands to cause communication DMA unit 213 to move values between NPU memory 219 and communication memory 215. According to the instructions, the NPU can be configured with two other NPUs as a reduction destination and a broadcast destination. For example, when the NPU is node 153 in FIG. 1C, node 155 can be the reduction destination and node 151 can be the broadcast destination. The NPU can copy the gradient value generated by the COMPUTE task from the NPU memory (e.g., NPU memory 219) into a communication memory (e.g., communication memory 215). If the NPU is not the first NPU in the topology (e.g., node 151), then it can wait until a flag (e.g., a semaphore flag) is set indicating that a received gradient value has been written to a particular location in the communication memory (e.g., by ICC module 209). In this non-limiting example, it can then accumulate the received gradient value with the locally generated gradient value. If the NPU is not the last NPU in the topology, then it can send the accumulated value to the next node in the topology (e.g., node 155) and transmit the flag value indication the availability of the reduced gradient value. The NPU can then wait until a second flag is set indicating that a final gradient value has been written to a particular location in the communication memory (e.g., by ICC module 209). The NPU can then write the final gradient value to the appropriate location in the NPU memory (e.g., NPU memory 219). In this non-limiting example, if the NPU is the last node, then it can generate the final gradient value by dividing the accumulated gradient value by the number of nodes in the topology. The NPU can then send the final gradient value to the broadcast destination (and transmit a second flag value indicating the availability of the final gradient value).

As depicted in FIG. 4, the all reduce operation can be performed after completion of each batch compute. The all_reduce operation can enable the sharing of synchronization information amount between NPUs, even when those NPU are associated with different CPUs (e.g., NPUs 0-M associated with CPU N can share synchronization information with NPUs 0-N associated with CPU 0). In some embodiments, the cores can be configured to perform other tasks while the communications processor performs the all reduce operation, increasing the efficiency of the NPU. In some embodiments, the all reduce operation of a first batch and at least some portions of the compute operation of a subsequent batch can be run in parallel, increasing the speed of the NPU.

Figure 5:
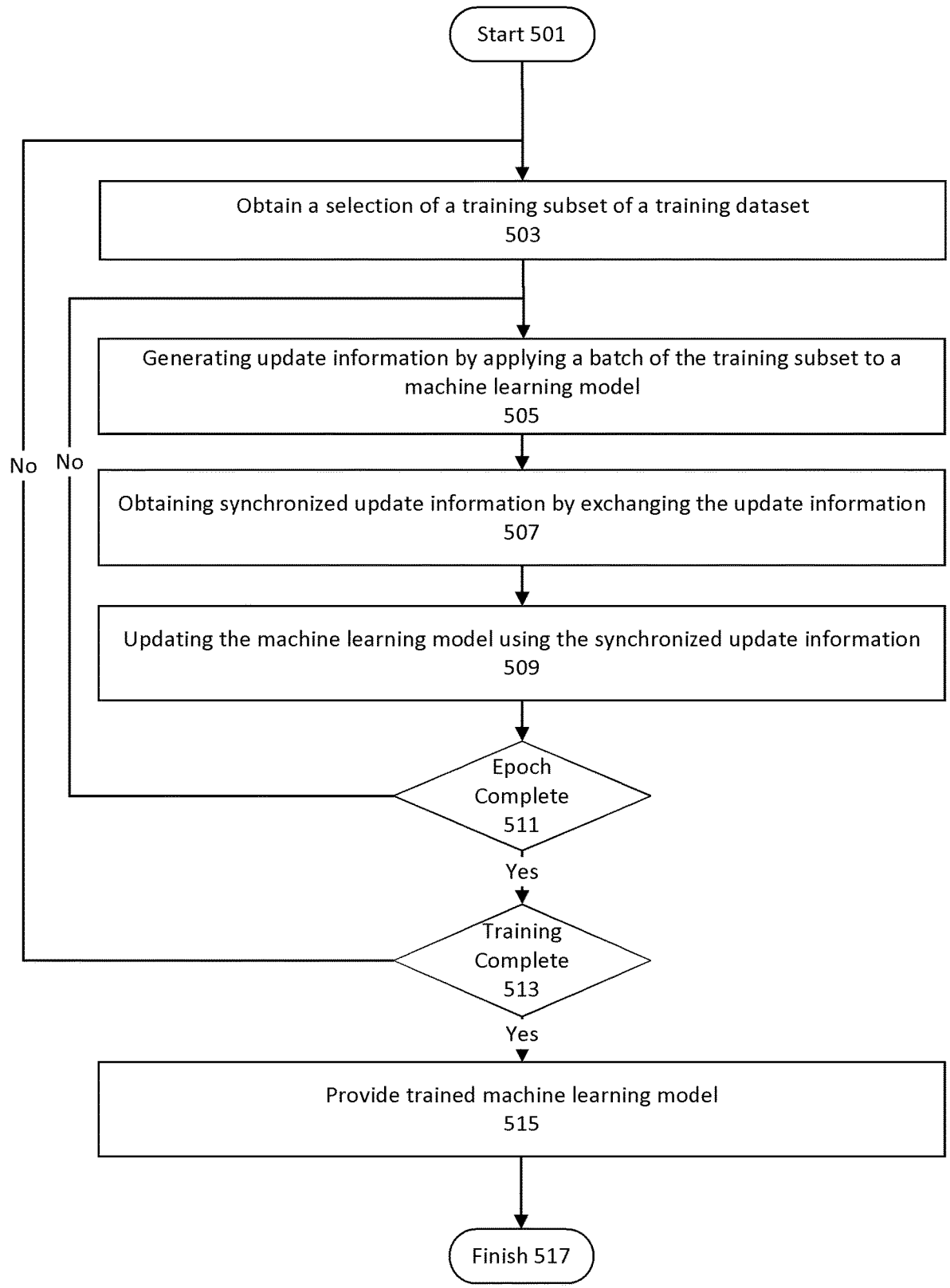
FIG. 5 depicts an exemplary method for training a machine learning model using a synchronization network, in accordance with some embodiments of the present disclosure.

FIG. 5 depicts an exemplary method 500 for training a machine learning model using a synchronization network, consistent with disclosed embodiments. Method 500 can be performed using a system (e.g., system 100 as described with regards to FIG. 1A) including at least one host device. Each host device can include a CPU and associated NPUs. The NPUs in the host device(s) can be communicatively connected using a synchronization network. The NPUs can include generation components that support training of the machine learning model and synchronization components that support the exchange of synchronization information between NPUs (e.g., as described with regards to FIG. 2A). The synchronization network can connect the NPUs according to a topology (e.g., such as the linear, tree, or ring topologies depicted in FIGS. 1C to 1E, or other suitable topologies, such as those described in U.S. patent application Ser. Nos. 16/777,731, 16/777,771, or 16/777,683). The topology of the synchronization network can be determined during the creation of the system (e.g., based on physical connections between host devices) or during the performance of method 500 (e.g., using software or firmware control of the synchronization network). Using the synchronization network, the system can perform an AllReduce exchange of synchronization information, as described in FIGS. 3A and 3B and FIG. 4. By enabling the NPUs performing the training task to offload synchronization onto a dedicated synchronization network, method 500 can improve the training speed of the machine learning model and improve the utilization efficiency of the NPUs.

Method 500 can start at step 501. In step 501, the system can be configured to train the machine learning model. In some embodiments, a program can configure the system to perform the training, as described above with regards to FIG. 4. The program can be obtained by the system through interactions with a user or another computing device. The program can specify training divided into epochs, with the model trained over a portion of the training data in each epoch. In some instances, the portion can be the entire training dataset. In some embodiments, the program can specify a topology of the synchronization network, which can be realized using software or firmware controls in the host devices.

Consistent with disclosed embodiments, the system can be configured to distribute training tasks among a set of host devices. Each host device can include a CPU and a set of associated NPUs. Each CPU can be configured to distribute training subtasks to the NPUs associated with that CPU. A training task or subtask can indicate the computations to be performed by the CPU or NPU. The training task or subtask can indicate or include the training data to use in performing the computations. For example, the training data to be used by a CPU in performing training task can be indicated in the task or distributed with the task. Similarly, the training data to be used by an NPU in performing a training subtask can be indicating in the subtask or distributed with the subtask. In embodiments in which an indication of the training data is distributed, the CPU (or NPU) can use the indication to obtain the appropriate training data (e.g., by retrieving the appropriate training data from a memory associated with the system).

The subtasks distributed by the CPUs can configure the NPUs to perform steps 503 to 509 of method 500. For clarity of discussion, these steps are described with regards to a single NPU of a particular host device. But the disclosed embodiments are not so limited—some or all of the following steps can be performed by some or all of the NPUs in the system.

In step 503, the NPU can obtain a selection of a training subset of a training dataset. The NPU can obtain the selection from the CPU of the host device. The training subset can be a portion of a larger subset of the training data assigned to the CPU. The NPU can obtain the selection of the training subset by obtaining the training subset (e.g., the actual training data) or by obtaining an identifier or location of the training subset (e.g., a URL of a storage location of the subset, one or more memory addresses or address ranges for the training subset, or other suitable retrieval information).

In step 505, the NPU can generate update information by applying a batch of the training subset to a machine learning model. The batch can be a portion the training subset. The disclosed embodiments are not limited to any particular method of selecting the batch. Generation components of the NPU can compute the update information using the machine learning model and the batch of training information. For example, as described in FIG. 4, a command processor can configure cores of the NPU to calculate an error and a gradient for the machine learning model.

In step 507, the NPU can obtain synchronized update information. The NPU can obtain the synchronized update information, at least in part, by exchanging synchronization information with at least one other NPU. Exchanging synchronization information can include providing or receiving the synchronized update information. For example, the NPU can receive the synchronized update information from the at least one other NPU or provide the synchronized update information to the at least one other NPU. Additionally or alternatively, exchanging synchronization information can include providing or receiving the synchronization information used to generate the synchronized update information. In some instances, the provided synchronization information can be or include the update information generated in step 505. In various instances, the provided synchronization information can be based at least in part on the update information generated in step 505. For example, a communication processor of the NPU can generate the provided synchronization information using the update information generated in step 505 and synchronization information received from one or more other NPUs. For example, as described in FIGS. 1C to 1D, 3A, 3B, and 4, the communication processor can be configured to generate the provided synchronization information by accumulating locally generated update information and received synchronization information. In some embodiments, the NPU can participate in an AllReduce exchange of the synchronization information.

The NPU can exchange synchronization information with at least one other NPU associated with the same CPU (e.g., part of the same host device) or at least one NPUs associated with at least one different CPU. For example, the system can include a set of host devices, the NPU can be associated with a first host device and can exchange synchronization information with one of a second set of NPUs associated with a second host device.

As described herein, the NPU can exchange synchronization information with at least one other NPU using serializer/deserializer module(s) corresponding to the at least one other NPU. Synchronization information can be stored in partition(s) of a communication memory upon receipt from (or before transmission to) the least one other NPU. The partition(s) can correspond to the least one other NPU.

In step 509, the NPU can update the machine learning model using the synchronized update information. In some embodiments, a communication processor of the NPU can write the synchronized update information to a memory of the NPU. A command processor of the NPU can then update the machine learning model using the synchronized update information. For example, when the machine learning model is a neural network and the synchronized update information is gradient information, the command processor can cause the NPU to generate new neural network parameters based on the existing parameters and the gradient information.

In step 511, the NPU can determine whether the epoch is complete. In some embodiments, the training subset may be divided into separate batches, and the epoch may be over when each batch has been used in training. In various embodiments, the batches may be generated by sampling from the training subset and the epoch may be over when a predetermined number of batches have been used in training. In some embodiments, until the epoch is completed, the NPU may continue generating first update information, obtaining synchronized updates, and updating the machine learning model, using differing batches of the training subset.

In step 513, the NPU can determine whether the training is complete. The system can be configured to perform the training task until a condition is satisfied. Suitable conditions can include or depend upon, without limitation, a number of epochs of training, a duration of training, a performance (e.g., classification accuracy, confusion matrix, area under curve, mean squared error, or other suitable metric) of the machine learning model, or the like.

In step 515, the system can be configured to provide a trained version of the machine learning model. The trained version of the machine learning model can be stored in a memory by the system, provided to another computing device, displayed to a user, or the like. The disclosed embodiments are not limited to a particular method of provided the trained version of the machine learning model. In some embodiments, a host device of the system can provide the trained version. The CPU of the host device can be configured to receive the trained version of the machine learning model from an NPU associated with the CPU (e.g. using a host network as described in FIG. 1A). In various embodiments, an NPU can provide either a current version of the machine learning model or the synchronized update information to an associated CPU after each synchronization. When the CPU is configured to receive synchronized update information, the CPU can be configured to maintain an updated version of the machine learning model using the received synchronized update information.

In step 517, method 500 can finish. In some embodiments, upon completion of method 500 (e.g., immediately or some time after completion), the system can release resources associated with training the machine learning module.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In some embodiments, components (e.g., modules or the like) described herein can be implemented at least in part using circuitry (e.g., discrete components, integrated circuits, a combination of discrete and integrated components, or other suitable electronic or optical circuitry). In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A processing unit, comprising: a first communication module including circuitry for communicating between a host unit and the processing unit over a first communication network, the processing unit being configurable to receive training information for a machine learning model, using the first communication module, from the host unit; a core, the processing unit configurable using the training information to generate update information using the core; and a second communication module including circuitry for communicating between the processing unit and at least one second processing unit over a second communication network, the second communication network separate from the first communication network, the processing unit configurable using the training information to transmit first synchronization information for updating the machine learning model to the at least one second processing unit, the first synchronization information including or based on the update information.

2. The processing unit of clause 1, further comprising: a command processor configurable using the training information to manage generation of the update information by the core; and a communication processor configurable using the training information to manage provision of the first synchronization information to the at least one second processing unit.

3. The processing unit of clause 2, further comprising: a communication memory accessible to the communication processor, wherein: the communication processor is configurable to: obtain the update information from the communication memory; and generate the first synchronization information using the update information and second synchronization information received from the at least one second processing unit; and the core is configurable to: update the machine learning model based at least in part on the first synchronization information.

4. The processing unit of clause 3, further comprising: a shared memory accessible to the communication processor and the core, wherein: the communication processor is further configurable to store the first synchronization information in the shared memory; and the core is further configurable to obtain the first synchronization information from the shared memory before updating the machine learning model.

5. The processing unit of clause 3, wherein: the communication memory is further accessible to the second communication module; and the second communication module includes circuitry configurable to: obtain the first synchronization information from the communication memory and provide the first synchronization information to one of the at least one second processing unit.

6. The processing unit of clause 2, further comprising: a communication memory accessible to the communication processor and the second communication module, wherein: the communication processor is configurable to: store the update information in the communication memory; and the second communication module includes circuitry configurable to: obtain the update information from the communication memory and provide the update information as the first synchronization information to one of the at least one second processing unit.

7. The processing unit of clause 2, wherein: the processing unit further comprises a communication memory configurable to include multiple partitions; the second communication module comprises multiple serialization units, each serialization unit including circuitry configurable to: read the first synchronization information from a corresponding one of the multiple partitions and provide the first synchronization information to a corresponding one of the at least one second processing unit; and receive second synchronization information from the corresponding one of the at least one second processing unit and write the second synchronization information to the corresponding one of the multiple partitions.

8. The processing unit of clause 2, wherein: the processing unit further comprises a communication memory; and the communication processor comprises processors corresponding to the respective ones of the at least one second processing unit; or is configurable to execute processes corresponding to the respective ones of the at least one second processing unit; and the processors or processes are each configurable to independently read received synchronization information from the communication memory, generate updated synchronization information, and write the updated synchronization information to the communication memory.

9. The processing unit of any one of clauses 1 to 8, wherein: the first communication module is configured to communicate using PCI express; and the second communication module includes circuitry supporting point-to-point communication between the processing unit the at least one second processing unit.

10. The processing unit of any one of clauses 1 to 9, wherein: the machine learning model is a neural network and the update information includes gradient information for updating neural network weights.

11. A device comprising: a first host device; and first processing units, each of the first processing units including: a first communication module including circuitry for communicating with the first host device over a first network; and a second communication module including circuitry enabling communication between the each one of the first processing units and at least another one of the first processing units over a second network; and wherein the first processing units are configured to: obtain, by each of the first processing units, a synchronized update for a machine learning model at least in part by exchanging synchronization information using the second network, each of the first processing units maintaining a version of the machine learning model; and synchronize, by each of the first processing units, each version by updating each version using the synchronized update.

12. The device of clause 11, wherein: a first processing unit of the first processing units further includes: a communication processor; and a communication memory; and the first processing unit is configured to exchange synchronization information at least in part by: receiving, from at least one second processing unit using the second communication module, first synchronization information and storing the first synchronization information in the communication memory; generating, by the communication processor, second synchronization information using the first synchronization information and storing the second synchronization information in the communication memory; providing, to at least one third processing unit, the second synchronization information.

13. The device of clause 12, wherein: the at least one second processing unit or the at least one third processing unit comprises: a processing unit configured to communicate with a second host device over a third network, the second host device separate from the first host device.

14. The device of any one of clauses 12 to 13, wherein: the communication memory comprises partitions; the second communication module comprises serialization units, each serialization unit including circuitry configured to read to and write from one of the partitions; and at least one of the serialization units includes circuitry respectively configured to communicate with the at least one second processing unit.

15. The device of any one of clauses 11 to 14, wherein: the second communication module includes circuitry enabling point-to-point communication between the each one of the first processing units and at least another one of the first processing units over the second network.

16. The device of any one of clauses 11 to 15, wherein: the first processing units are configured to each obtain the synchronized update by implementing an AllReduce exchange of the synchronization information.

17. A method of training a machine learning model comprising: obtaining, from a first host device of a set of host devices by a first processing unit of a first set of processing units associated with the first host device using a first communication network, a selection of a training subset of a training dataset; generating first update information for the machine learning model, using a command processor of the first processing unit, by applying a batch of the training subset to the machine learning model; obtaining a synchronized update at least in part by providing, using a communication processor of the first processing unit and a second communication network, first synchronization information to at least one other processing unit, the first synchronization information being or based at least in part on the first update information; and updating the machine learning model using the synchronized update.

18. The method of clause 17, wherein: the at least one other processing unit includes: one of the first set of processing units; or one of a second set of processing units associated with a second host device of the set of host devices.

19. The method of any one of clauses 17 to 18, further comprising: repeatedly generating first update information, obtaining synchronized updates, and updating the machine learning model, by the first processing unit using differing batches of the training subset; and after completion of the repeated generation, providing the updated machine learning model to the first host device using the first communication network.

20. The method of any one of clauses 17 to 19, wherein: obtaining the synchronized update further comprises receiving from a first unit of the at least one other processing unit: the synchronized update, or second synchronization information, the first synchronization information based at least in part on the first update information and the second synchronization information.

21. The method of clause 20, wherein: obtaining the synchronized update further comprises receiving second synchronization information; receiving the second synchronization information comprises: receiving, by a first serializer configured to communicate with the first unit, the second synchronization information; and storing the second synchronization information in a communication memory; and providing the first synchronization information comprises: generating, by the communication processor, the first synchronization information using the second synchronization information and the first update information; storing the first synchronization information in a partition of the communication memory accessible to a second serializer, the second serializer configured to communicate with a second unit of the at least one other processing unit; and providing the first synchronization information to the second unit.

22. The method of clause 21, wherein: the first synchronization information is generated using at least one third synchronization information received from at least one third unit of the at least one other processing unit, or the first synchronization information comprises the synchronized update.

23. The method of any one of clauses 17 to 22, wherein: the first processing unit and the at least one other processing unit implement an AllReduce exchange to collectively generate the synchronized update.

24. The method of any one of clauses 17 to 23, wherein: the second communication network is a point-to-point network.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A processing unit, comprising:
    a first communication module including circuitry for communicating between a host unit and the processing unit over a first communication network, the processing unit being configurable to receive training information for a machine learning model, using the first communication module, from the host unit;
    a communication memory configurable to include multiple partitions;
    a core, the processing unit configurable using the training information to generate update information using the core; and
    a second communication module including circuitry for communicating between the processing unit and at least one second processing unit over a second communication network using the multiple partitions and at least one serialization unit, the second communication network being separate from the first communication network, the processing unit configurable using the training information to transmit first synchronization information for updating the machine learning model to the at least one second processing unit, the first synchronization information including or based on the update information.

2. The processing unit of claim 1, further comprising:
    a command processor configurable using the training information to manage generation of the update information by the core; and
    a communication processor configurable using the training information to manage provision of the first synchronization information to the at least one second processing unit.

3. The processing unit of claim 2, wherein:
    the communication memory is accessible to the communication processor;
    the communication processor is configurable to:
        obtain the update information from the communication memory; and
        generate the first synchronization information using the update information and second synchronization information received from the at least one second processing unit; and
    the core is configurable to:
        update the machine learning model based at least in part on the first synchronization information.

4. The processing unit of claim 3, further comprising:
    a shared memory accessible to the communication processor and the core, wherein:
        the communication processor is further configurable to store the first synchronization information in the shared memory; and
        the core is further configurable to obtain the first synchronization information from the shared memory before updating the machine learning model.

5. The processing unit of claim 3, wherein:
    the communication memory is further accessible to the second communication module; and
    the second communication module includes circuitry configurable to:
        obtain the first synchronization information from the communication memory and provide the first synchronization information to one of the at least one second processing unit.

6. The processing unit of claim 2, wherein:
    the communication memory is accessible to the communication processor and the second communication module;
    the communication processor is configurable to:
        store the update information in the communication memory; and
    the second communication module includes circuitry configurable to:
        obtain the update information from the communication memory and provide the update information as the first synchronization information to one of the at least one second processing unit.

7. The processing unit of claim 1, wherein:
    the second communication module comprises multiple serialization units, the multiple serialization units including the at least one serialization unit, each of the multiple serialization units including circuitry configurable to:
        read the first synchronization information from a corresponding one of the multiple partitions and provide the first synchronization information to a corresponding one of the at least one second processing unit; and
        receive second synchronization information from the corresponding one of the at least one second processing unit and write the second synchronization information to the corresponding one of the multiple partitions.

8. The processing unit of claim 2, wherein:
    the communication processor
        comprises processors corresponding to the respective ones of the at least one second processing unit; or
        is configurable to execute processes corresponding to the respective ones of the at least one second processing unit; and
    the processors or processes are each configurable to independently read received synchronization information from the communication memory, generate updated synchronization information, and write the updated synchronization information to the communication memory.

9. The processing unit of claim 1, wherein:
    the first communication module is configured to communicate using PCI express; and
    the second communication module includes circuitry supporting point-to-point communication between the processing unit the at least one second processing unit.

10. The processing unit of claim 1, wherein:
the machine learning model is a neural network and the update information includes gradient information for updating neural network weights.

11. A device comprising:
a first host device; and
first processing units, each of the first processing units including:
- a communication memory including multiple partitions;
- a first communication module including circuitry for communicating with the first host device over a first network; and
- a second communication module including circuitry enabling communication between the each one of the first processing units and at least another one of the first processing units over a second network using the multiple partitions and at least one serialization unit; and wherein the first processing units are configured to:
- obtain, by each of the first processing units, a synchronized update for a machine learning model at least in part by exchanging synchronization information using the second network, each of the first processing units maintaining a version of the machine learning model; and
- synchronize, by each of the first processing units, each version by updating each version using the synchronized update.

12. The device of claim 11, wherein:
a first processing unit of the first processing units further includes a communication processor; and
the first processing unit is configured to exchange synchronization information at least in part by:
- receiving, from at least one second processing unit using the second communication module, first synchronization information and storing the first synchronization information in the communication memory;
- generating, by the communication processor, second synchronization information using the first synchronization information and storing the second synchronization information in the communication memory; and
- providing, to at least one third processing unit, the second synchronization information.

13. The device of claim 12, wherein:
the at least one second processing unit or the at least one third processing unit comprises:
- a processing unit configured to communicate with a second host device over a third network, the second host device separate from the first host device.

14. The device of claim 12, wherein:
the second communication module comprises multiple serialization units, the multiple serialization units including the at least one serialization unit, each of the multiple serialization units including circuitry configured to read to and write from one of the multiple partitions; and
at least one of the serialization units includes circuitry respectively configured to communicate with the at least one second processing unit.

15. The device of claim 11, wherein:
the second communication module includes circuitry enabling point-to-point communication between the each one of the first processing units and at least another one of the first processing units over the second network.

16. The device of claim 11, wherein:
the first processing units are configured to each obtain the synchronized update by implementing an AllReduce exchange of the synchronization information.

17. A method of training a machine learning model comprising:
- obtaining, from a first host device of a set of host devices by a first processing unit of a first set of processing units associated with the first host device using a first communication network, a selection of a training subset of a training dataset;
- generating first update information for the machine learning model, using a command processor of the first processing unit, by applying a batch of the training subset to the machine learning model;
- obtaining a synchronized update at least in part by providing, using a communication processor of the first processing unit, a communication memory containing multiple partitions, at least one serialization unit, and a second communication network, first synchronization information to at least one other processing unit, the first synchronization information being or based at least in part on the first update information; and
- updating the machine learning model using the synchronized update.

18. The method of claim 17, wherein:
the at least one other processing unit includes: one of the first set of processing units; or
one of a second set of processing units associated with a second host device of the set of host devices.

19. The method of claim 17, further comprising:
- repeatedly generating first update information, obtaining synchronized updates, and updating the machine learning model, by the first processing unit using differing batches of the training subset; and
- after completion of the repeated generation, providing the updated machine learning model to the first host device using the first communication network.

20. The method of claim 17, wherein:
obtaining the synchronized update further comprises receiving from a first other processing unit of the at least one other processing unit:
- the synchronized update, or
- second synchronization information, the first synchronization information based at least in part on the first update information and the second synchronization information.

21. The method of claim 20, wherein:
obtaining the synchronized update further comprises receiving second synchronization information;
receiving the second synchronization information comprises:
- receiving, by a first serialization unit of the at least one serialization unit, the first serialization unit configured to communicate with the first other processing unit, the second synchronization information; and
- storing the second synchronization information in the communication memory; and
providing the first synchronization information comprises:
- generating, by the communication processor, the first synchronization information using the second synchronization information and the first update information;

storing the first synchronization information in a partition of the communication memory accessible to a second serialization unit of the at least one serialization unit, the second serialization unit configured to communicate with a second other processing unit of the at least one other processing unit; and providing the first synchronization information to the second other processing unit.

22. The method of claim 21, wherein:

the first synchronization information is generated using at least one third synchronization information received from at least one third other processing unit of the at least one other processing unit, or the first synchronization information comprises the synchronized update.

23. The method of claim 17, wherein:

the first processing unit and the at least one other processing unit implement an AllReduce exchange to collectively generate the synchronized update.

24. The method of claim 17, wherein:

the second communication network is a point-to-point network.

* * * * *